US011405434B2

(12) United States Patent
Oyama et al.

(10) Patent No.: US 11,405,434 B2
(45) Date of Patent: Aug. 2, 2022

(54) DATA SHARING METHOD PROVIDING RECEPTION STATUS OF SHARED DATA AMONG RECEIVING TERMINALS, AND COMMUNICATION SYSTEM AND RECORDING MEDIUM THEREFOR

(71) Applicants: Taira Oyama, Kanagawa (JP); Takuya Imai, Tokyo (JP); Tatsuroh Sugioka, Kanagawa (JP)

(72) Inventors: Taira Oyama, Kanagawa (JP); Takuya Imai, Tokyo (JP); Tatsuroh Sugioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/038,430

(22) Filed: Sep. 30, 2020

(65) Prior Publication Data

US 2021/0105307 A1 Apr. 8, 2021

(30) Foreign Application Priority Data

Oct. 4, 2019 (JP) ............................ JP2019-183972

(51) Int. Cl.
*H04L 65/403* (2022.01)
*H04L 12/18* (2006.01)

(52) U.S. Cl.
CPC ........ *H04L 65/403* (2013.01); *H04L 12/1813* (2013.01)

(58) Field of Classification Search
CPC .......................... H04L 65/403; H04L 12/1813
See application file for complete search history.

(56) References Cited

U.S. PATENT DOCUMENTS

| | | | |
|---|---|---|---|
| 8,850,184 B2 | 9/2014 | Imai | |
| 9,519,451 B2 | 12/2016 | Imai et al. | |
| 9,781,384 B2 | 10/2017 | Imai et al. | |
| 9,800,629 B2 | 10/2017 | Imai et al. | |
| 9,864,563 B2 | 1/2018 | Imai et al. | |
| 10,547,652 B2 | 1/2020 | Imai et al. | |
| 2006/0271624 A1* | 11/2006 | Lyle | H04L 12/1822 709/204 |

(Continued)

FOREIGN PATENT DOCUMENTS

JP 2004-280133 10/2004

*Primary Examiner* — Jeong S Park
(74) *Attorney, Agent, or Firm* — IPUSA, PLLC

(57) ABSTRACT

A communication system includes a first communication terminal; and two or more second communication terminals that share shared data with each other. The first communication terminal transmits the shared data; and transmits, to the second communication terminal that has transmitted a share completion report indicating that sharing of the shared data has been completed, a share status report indicating that there is the second communication terminal that has not yet transmitted the share completion report, based on whether the share completion report has been received from the second communication terminal. The second communication terminal receives the shared data; and displays the share status report indicating that there is the second communication terminal that has not yet transmitted the share completion report, upon receiving the share status report indicating that there is the second communication terminal that has not yet transmitted the share completion report.

11 Claims, 20 Drawing Sheets

(56) References Cited

U.S. PATENT DOCUMENTS

| | | | | |
|---|---|---|---|---|
| 2014/0009563 | A1* | 1/2014 | Leske | H04N 7/141<br>348/E7.083 |
| 2015/0033149 | A1* | 1/2015 | Kuchoor | H04N 21/4782<br>715/753 |
| 2018/0285054 | A1* | 10/2018 | Kim | H04L 41/5067 |
| 2019/0303087 | A1* | 10/2019 | Tsukamoto | H04L 12/1822 |
| 2021/0377322 | A1* | 12/2021 | Vajravel | H04L 65/4015 |

* cited by examiner

FIG.12

| COMMUNICATION TERMINAL ON RECEIVING SIDE | SHARE COMPLETION REPORT PRESENT OR ABSENT |
|---|---|
| 01bb | PRESENT |
| 01cc | – |

DATA SHARING METHOD PROVIDING RECEPTION STATUS OF SHARED DATA AMONG RECEIVING TERMINALS, AND COMMUNICATION SYSTEM AND RECORDING MEDIUM THEREFOR

CROSS-REFERENCE TO RELATED APPLICATION

The present application is based on and claims priority under 35 U.S.C. § 119 to Japanese Patent Application No. 2019-183972, filed on Oct. 4, 2019, the contents of which are incorporated herein by reference in their entirety.

BACKGROUND OF THE INVENTION

1. Field of the Invention

The present invention relates to a communication system, a data sharing method, and a recording medium.

2. Description of the Related Art

There is known a communication system in which an image, voice sound, shared data (material data) and the like are shared among multiple sites in real-time. Such a communication system is used for remote communication, such as in a video conference system and a web conference system. Further, such a communication system is also used in a data distribution system for unidirectional distribution of images and the like.

For example, a technique is known in which, when a first communication terminal on the transmitting side transmits the shared data, a second communication terminal on the receiving side reports, to the first communication terminal on the transmitting side, that reception has been completed (for example, see Patent Document 1). Patent Document 1 discloses a conference method in which a presenter on the transmitting side proceeds with a presentation while confirming that the display screen of the second communication terminal on the receiving side has been switched upon receiving shared data.

Patent Document 1: Japanese Unexamined Patent Application Publication No. 2004-280133

SUMMARY OF THE INVENTION

According to one aspect of the present invention, there is provided a communication system including a first communication terminal; and two or more second communication terminals, wherein the first communication terminal and the two or more of second communication terminals are configured to share shared data with each other, wherein the first communication terminal includes a first share processor configured to transmit the shared data; and a share completion determiner configured to transmit, to at least one of the two or more second communication terminals that has transmitted a share completion report indicating that sharing of the shared data has been completed, a share status report indicating that there is at least one of the two or more second communication terminals that has not yet transmitted the share completion report, based on whether the share completion report has been received from the two or more second communication terminals, and each of the two or more second communication terminals includes a second share processor configured to receive the shared data; and a share status reporter configured to display the share status report indicating that there is at least one of the two or more second communication terminals that has not yet transmitted the share completion report, upon receiving the share status report indicating that there is at least one of the two or more second communication terminals that has not yet transmitted the share completion report.

BRIEF DESCRIPTION OF THE DRAWINGS

FIG. 12 is a diagram illustrating an example of progress management information recorded by a progress managing unit according to the first embodiment of the present invention;

DETAILED DESCRIPTION OF THE PREFERRED EMBODIMENTS

In the conventional technology, there is a problem that the second communication terminals on the receiving side cannot share the reception status of the shared data, such as the materials, at the second communication terminals. For example, suppose that there are two or more second communication terminals on the receiving side. The user of the first communication terminal on the transmitting side waits before starting an explanation, until a "share completion" report is received from all of the second communication terminals on the receiving side. Therefore, when one of the second communication terminals completes the reception of the shared data, but it takes a long time for another one of the second communication terminal to receive the shared data due to, for example, a bad network environment, a user of the one of the second communication terminals on the receiving side that has already completed the reception, may feel worried or stressed because an explanation by the user of the communication terminal on the transmitting side does not start.

A problem to be addressed by an embodiment of the present invention is to provide a communication system in which communication terminals on the receiving side can share the reception status of the shared data.

Hereinafter, as an example of an embodiment of the present invention, a communication terminal and a data sharing method performed by the communication terminal will be described with reference to the drawings.

First Embodiment

<Outline of Process According to the First Embodiment>

Figure 1A:
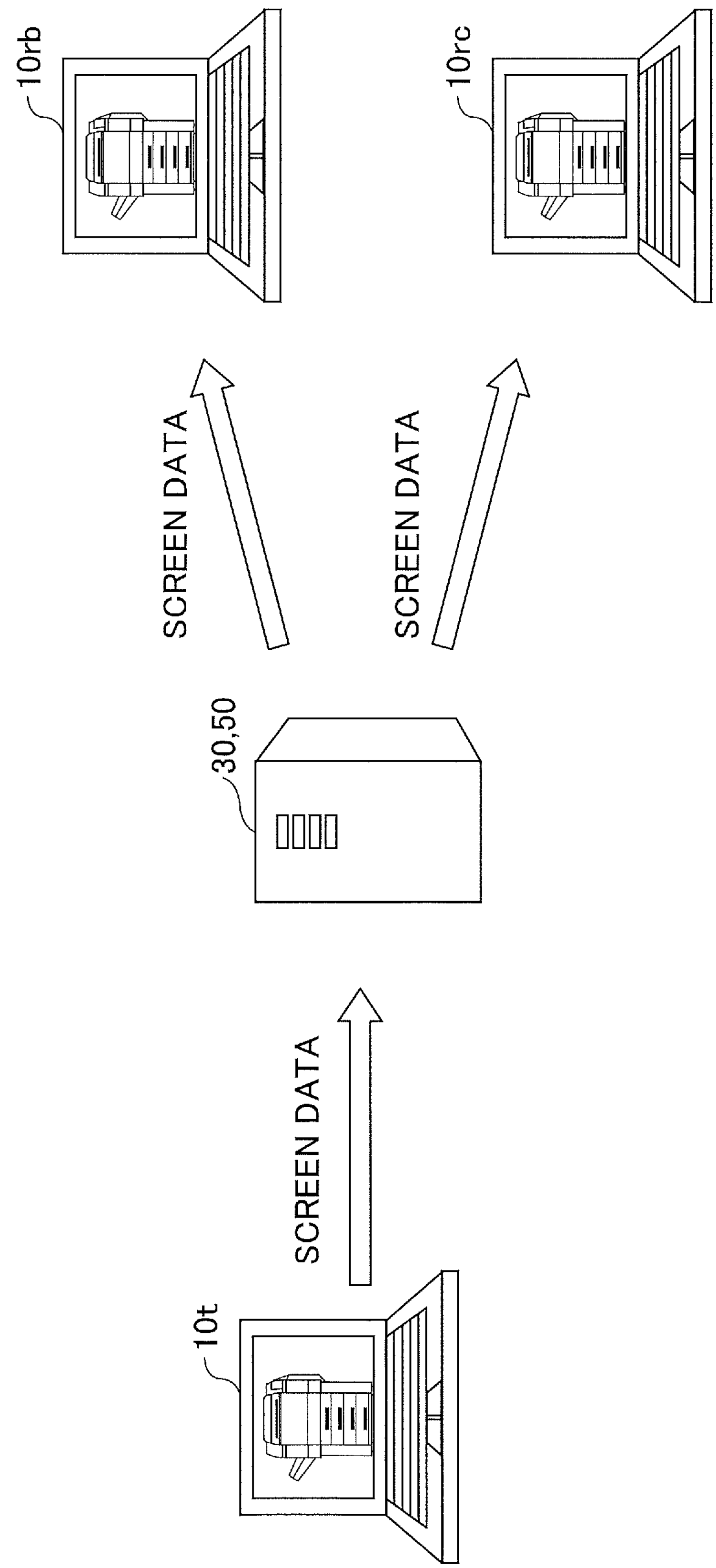
FIGS. 1A and 1B are schematic diagrams for describing a process in which shared data is shared in a communication system according to a first embodiment of the present invention.
Figure 1B:
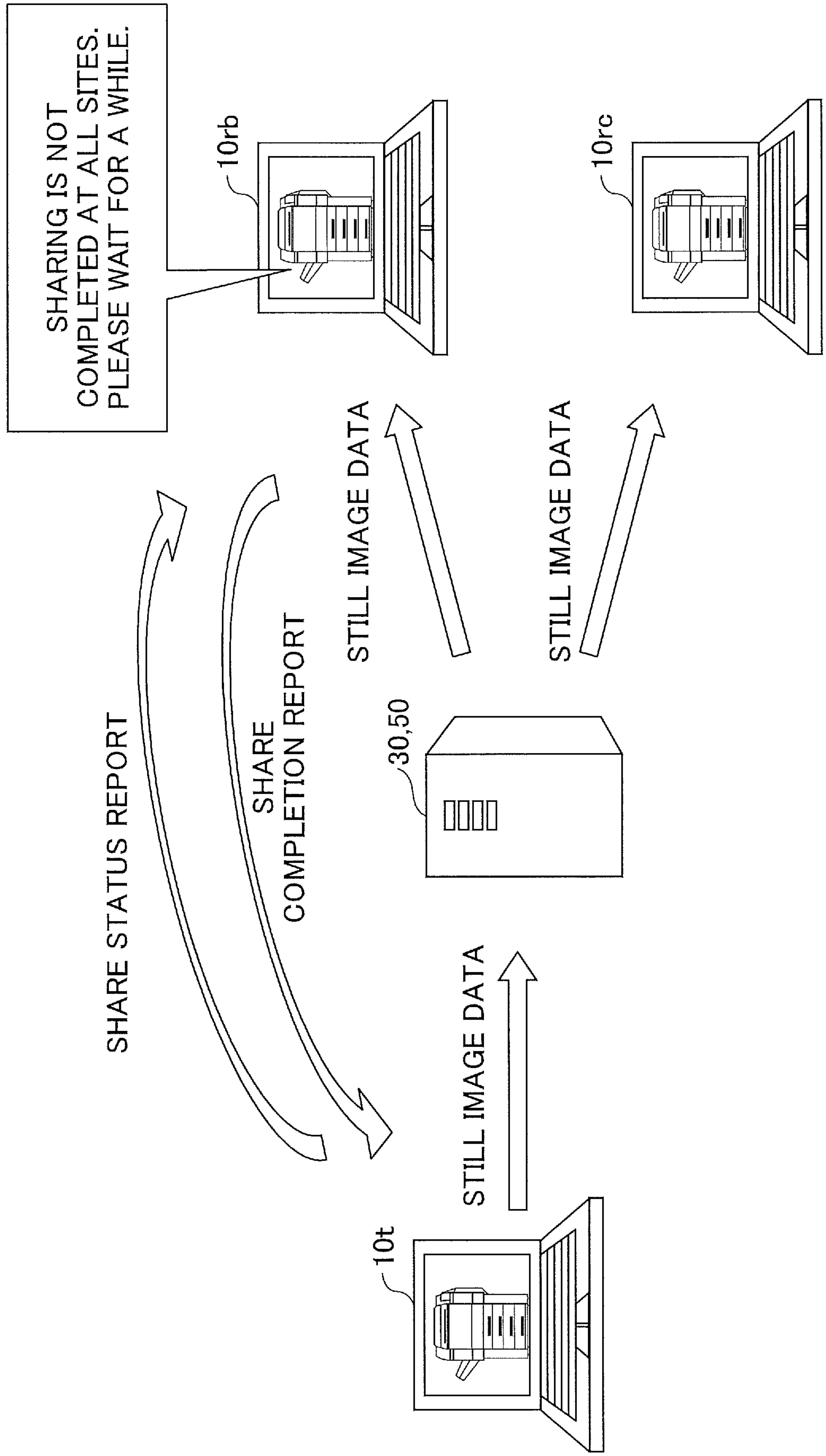

FIGS. 1A and 1B are diagrams schematically illustrating a process in which shared data is shared in a communication system. First, in FIG. 1A, two communication terminals 10*rb* and 10*rc* on the receiving side share a screen displayed by a communication terminal 10*t* on the transmitting side via a relay apparatus 30 to be described later. Hereinafter, any one of the communication terminals 10*rb* and 10*rc* on the receiving side that receive the shared data may be referred to as the communication terminal 10*r*. Further, any one of the communication terminal 10*t* on the transmitting side (an example of the first communication terminal) and the communication terminal 10*r* on the receiving side (an example of the second communication terminal) may be referred to as the communication terminal 10.

When sharing a material and the like on a screen, the communication terminal 10*t* on the transmitting side repeatedly captures the displayed screen and transmits a screen image. Therefore, the communication terminal 10*t* on the transmitting side transmits a screen image of a relatively low resolution to the relay apparatus 30.

In some cases, the user of the communication terminal 10*t* on the transmitting side may want to share a screen of high resolution. For example, when a drawing of computer-aided design (CAD) is shared on the screen, but the resolution is low in the shared screen, details of the drawing may be lost and it may not be possible to share the drawing. In this case, the user starts to share a still image. The communication terminal 10*t* on the transmitting side imports the screen as high-resolution still image data and transmits the still image data to the communication terminal 10*r* on the receiving side via the relay apparatus 30. The still image data preferably has high resolution (e.g., 4K, 8K, 16K, etc.) in consideration of the applications thereof and has a large data size.

The network band of the two communication terminals 10*r* on the receiving side is not necessarily the same, and the larger the data size, the larger the difference in the time it takes to complete the reception of the still image data between the two communication terminals 10*r* on the receiving side. When the communication terminal 10*rb* of one receiving side completes the reception of the still image data, but the communication terminal 10*rc* of the other receiving side takes time to complete the sharing (i.e., to complete the reception of the still image data) because, for example, the network environment of the communication terminal 10*rc* is bad, the user of the communication terminal 10*rb* which has already completed the reception may feel worried or stressed because the explanation by the user of the communication terminal 10*t* on the transmitting side does not start.

Therefore, as illustrated in FIG. 1B, a communication system 1 operates as follows. When the communication terminal 10*rb* on the receiving side completes the reception of the still image data, the communication terminal 10*rb* on the receiving side transmits a share completion report to the communication terminal 10*t* on the transmitting side, via a transmission management apparatus 50 which will be described later. When the communication terminal 10*t* on the transmitting side does not receive a share completion report from all of the communication terminals 10*r* on the receiving side, the communication terminal 10*t* reports a share status to at least the communication terminal 10*rb* that has transmitted the share completion report. The share status is, for example, a message reading "Sharing has not been completed at all sites. Please wait for a while".

As described above, in the communication system according to the present embodiment, when all of the communication terminals 10*r* on the receiving side have not transmitted a share completion report to the communication terminal 10*t* on the transmitting side, the communication terminal 10*r* on the receiving side receives and displays a share status report reporting that it is taking time for reception. Therefore, the user on the receiving side recognizes the reason why the explanation by the transmitting side is not started, and is thus less prone to feel worried or stressed.

Terminology

A site is the location that is the base for an activity. The site is the location where the communication terminal 10 is installed or the location of the user.

Sharing means that two or more persons have the same information. Shared data is the data that is shared. In the present embodiment, a screen image, a high-definition still image, and a low-quality still image are examples of the shared data. There may be cases where one file is shared.

A share completion report is a report to inform that the sharing of the shared data has been completed. In the present embodiment, the share completion report indicates that reception of the shared data is completed ("sharing is completed" means that reception of the shared data has been completed).

The existence of a second communication terminal that has not transmitted a share completion report may be reported by information that conveys that there is a second communication terminal that has not received the shared data yet. This information may not only be a message, but may also be an icon display, voice sound guidance, an alarm sound, and the like.

<Example of System Configuration According to the First Embodiment>

Figure 2:
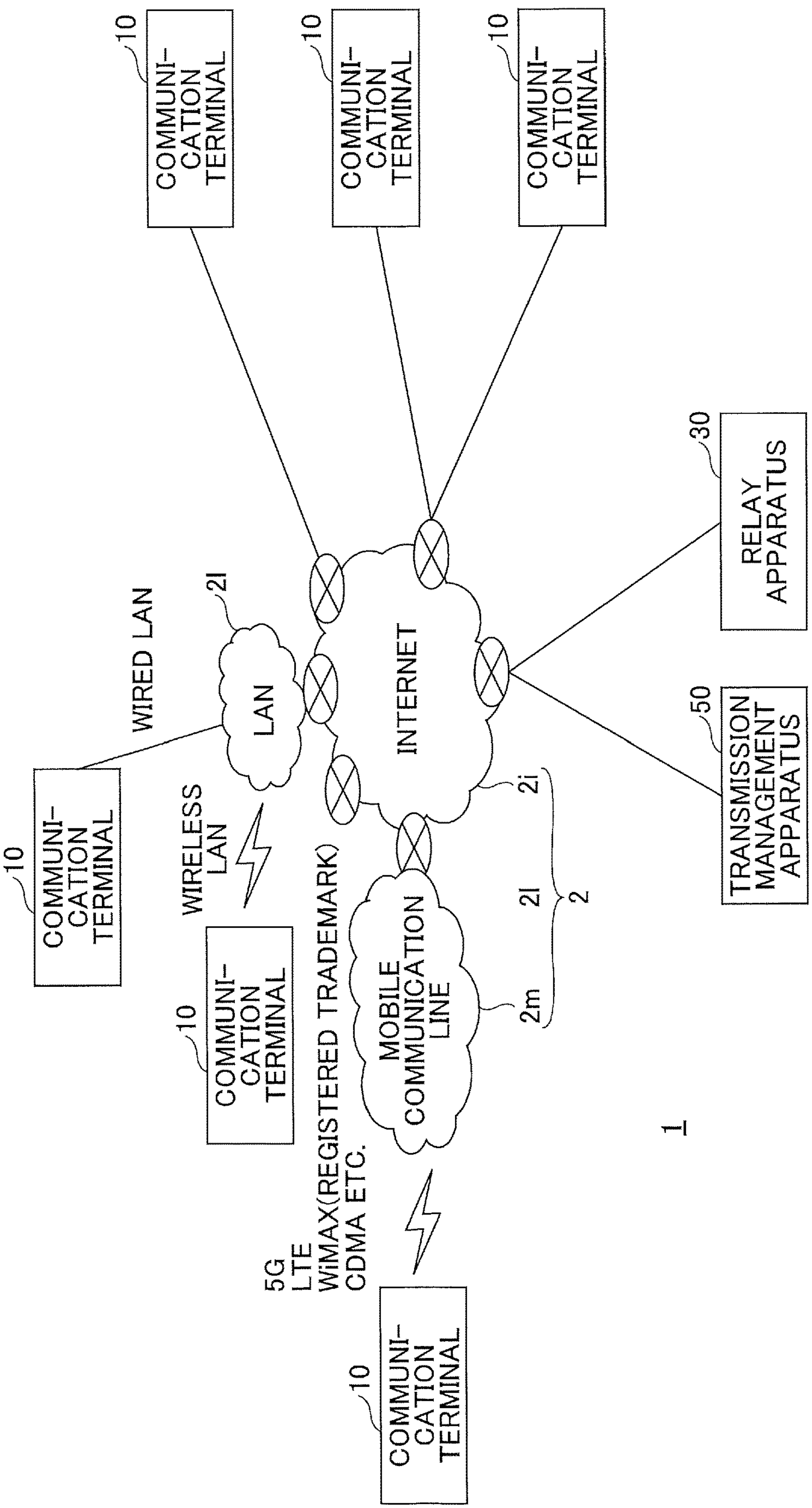
FIG. 2 is a diagram illustrating an example of a schematic configuration diagram of a communication system according to the first embodiment of the present invention.

FIG. 2 is an example of a schematic configuration diagram of a communication system 1. As illustrated in FIG. 2, the communication system 1 includes a plurality of the communication terminals 10, the transmission management apparatus 50, and the relay apparatus 30 that can communicate via a network.

The communication terminal 10, the transmission management apparatus 50, and the relay apparatus 30 are communicatively connected to each other via the Internet 2*i*, a local area network (LAN) 21, and a mobile communication line 2*m*. One or more of the Internet 2*i*, the LAN 21, and the mobile communication line 2*m* may simply be referred to as a communication network 2.

The LAN 21 includes not only a wired LAN but also a wireless LAN. For example, the mobile communication line 2*m* uses a communication method such as 5G, Long Term Evolution (LTE), Worldwide Interoperability for Microwave Access (WiMAX), and Code Division Multiple Access (CDMA). Communication may take place within the LAN 21 without necessarily involving the Internet 2*i*. The mobile communication line 2*m* may not be used in some cases.

The communication terminal 10 establishes a communication session with one or more of the other communication terminals 10 via the transmission management apparatus 50 and transmits and receives image data (camera image), voice sound data, and shared data (hereinafter collectively referred to as content data) via the relay apparatus 30 specified by the transmission management apparatus 50. The shared data includes videos and still images that are shared on screens.

The communication terminal 10 may be an exclusive-use terminal for the communication system 1 or a general-purpose terminal. The general-purpose terminal may be, for example, a personal computer (PC), a smartphone, a tablet terminal, and the like. By executing application software exclusively used for the communication system 1, the general-purpose terminal operates as the communication terminal 10.

In the case where the communication terminal 10 is a general-purpose terminal, the general-purpose terminal may be capable of remote communication by executing application software exclusively used for the communication system 1 or may be capable of remote communication by executing a general-purpose web browser. Still image sharing according to the present embodiment is also applicable to both exclusive-use application software and a general-purpose web browser.

In the screen sharing or the still image sharing, each of a plurality of the communication terminals 10 that are establishing a session, may serve as the communication terminal 10*t* on the transmitting side and the communication terminal 10*r* on the receiving side. The communication terminal 10 used by the user who has performed an operation for implementing screen sharing or still image sharing, is the communication terminal 10*t* on the transmitting side, and the other communication terminals 10 are the communication terminals 10*r* on the receiving side. The receiving side and the transmitting side are not fixed, but can be freely switched according to an operation by the user.

The transmission management apparatus 50 is one or more computers that manage the entire communication system 1 according to the present embodiment. The transmission management apparatus 50 is a server, and, therefore, the transmission management apparatus 50 has the functions of an information processing apparatus. The transmission management apparatus 50 manages the status of the communication terminal 10 and functions as a call control server that performs call control such as starting a session at two or more communication terminals 10 when an incoming call is received. Call control refers to a series of processes related to connections, such as having the other party receive a call upon accepting an outgoing call for starting communication, or accepting a response from the other party with respect to the outgoing call, disconnecting communication of the other party when either party disconnects communication, and the like. Further, the transmission management apparatus 50 often performs the authentication, searching, and monitoring of vitality, etc., of the communication terminal 10. The transmission management apparatus 50 also performs the management of a database necessary for controlling the communication system 1, such as a destination list of the communication terminals 10. The destination list is data in which the communication terminal 10 (or the user) of the destination to which each communication terminal 10 can transmit a request (call) for starting remote communication, is registered.

A status refers to the state of the communication terminal 10 in the communication system 1. The status is mainly classified into whether receiving calls is possible (online/offline) and transmission in progress. Further, the transmission management apparatus 50 performs state management of the relay apparatus 30, selection of the relay apparatus 30 used for remote communication, log in management of a user using the communication terminal 10, management of a data session established between a plurality of communication terminals 10, and the like.

The relay apparatus 30 is a computer that relays content data from one communication terminal 10 to the other communication terminal 10, among a plurality of the communication terminals 10 that perform remote communication. The relay apparatus 30 has functions of an information processing apparatus. The relay apparatus 30 monitors the network band with respect to the communication terminal 10 and transmits image data of a quality (high quality, medium quality, and low quality) suitable for the network band. Although only one relay apparatus 30 is illustrated in FIG. 2, a plurality of relay apparatuses 30 are often present.

The transmission management apparatus 50 or the relay apparatus 30 may be implemented by one or more information processing apparatuses. This information processing apparatus may also be referred to as a server. The information processing apparatus is located primarily on the Internet, but may be located on a local network (inside a firewall) such as a network in a company. One or more information processing apparatuses may be referred to as a cloud system. A cloud system is a system that uses cloud computing, and cloud computing is a form of use in which resources on a network are used without considering a specific hardware resource. Generally, a cloud system may represent an information processing system located on the Internet, but the cloud system may be located on a local network.

Figure 3:
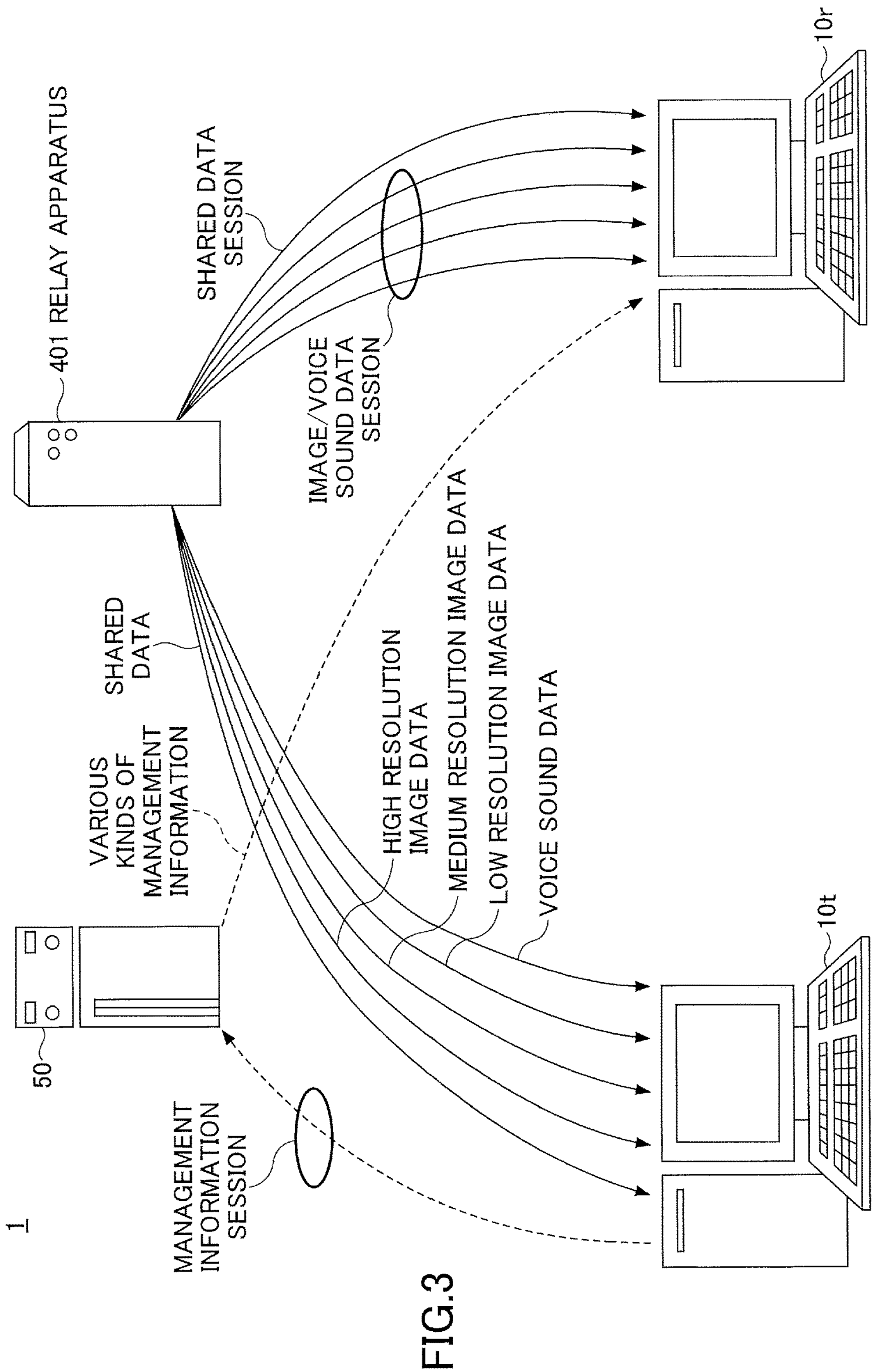
FIG. 3 is an example of a diagram illustrating a communication method for performing remote communication according to the first embodiment of the present invention.

The communication method when the communication system 1 performs remote communication will be described with reference to FIG. 3. FIG. 3 is an example of a diagram illustrating a communication method for performing remote communication. The communication terminal 10 that receives content data displays image data and shared data on a display and outputs voice sound data from a speaker. Such processes are continuously performed, thereby enabling a user at a remote location to perform remote communication.

Between the communication terminal 10*t* and the communication terminal 10*r* used for remote communication, four sessions are established for transmitting and receiving four pieces of data, that is, high resolution image data, medium resolution image data, low resolution image data, and voice sound data, via the relay apparatus 30. In FIG. 3, these four sessions are collectively illustrated as an image/voice sound data session.

In FIG. 3, a shared data session for transmitting and receiving the shared data shared by the remote communication, is established via the relay apparatus 30. Accordingly, it is possible for each communication terminal 10 to transmit and receive the shared data in a session (band) other than that used for the voice sound data and the image data.

The content data is transmitted via the relay apparatus 30 as an example. The content data may be transmitted and received via the transmission management apparatus 50. However, by installing the relay apparatus 30 separately from the transmission management apparatus 50, the load can be distributed. Further, there is a mechanism in which the two or more communication terminals 10 transmit and receive content data without involving the relay apparatus 30. In this case, the communication terminals 10 at the respective sites can communicate directly via the Internet.

As illustrated in FIG. 3, a management information session for transmitting and receiving various kinds of management information is established between the communication terminals 10 at different the sites in the communication system 1 via the transmission management apparatus 50. The above-described status, share status, etc., are monitored in the management information session.

<Example of Hardware Configuration According to the First Embodiment>

Next, the hardware configuration of the communication terminal 10, the transmission management apparatus 50, and the relay apparatus 30 will be described.

<<Hardware Configuration of Communication Terminal According to the First Embodiment>>

Figure 4:
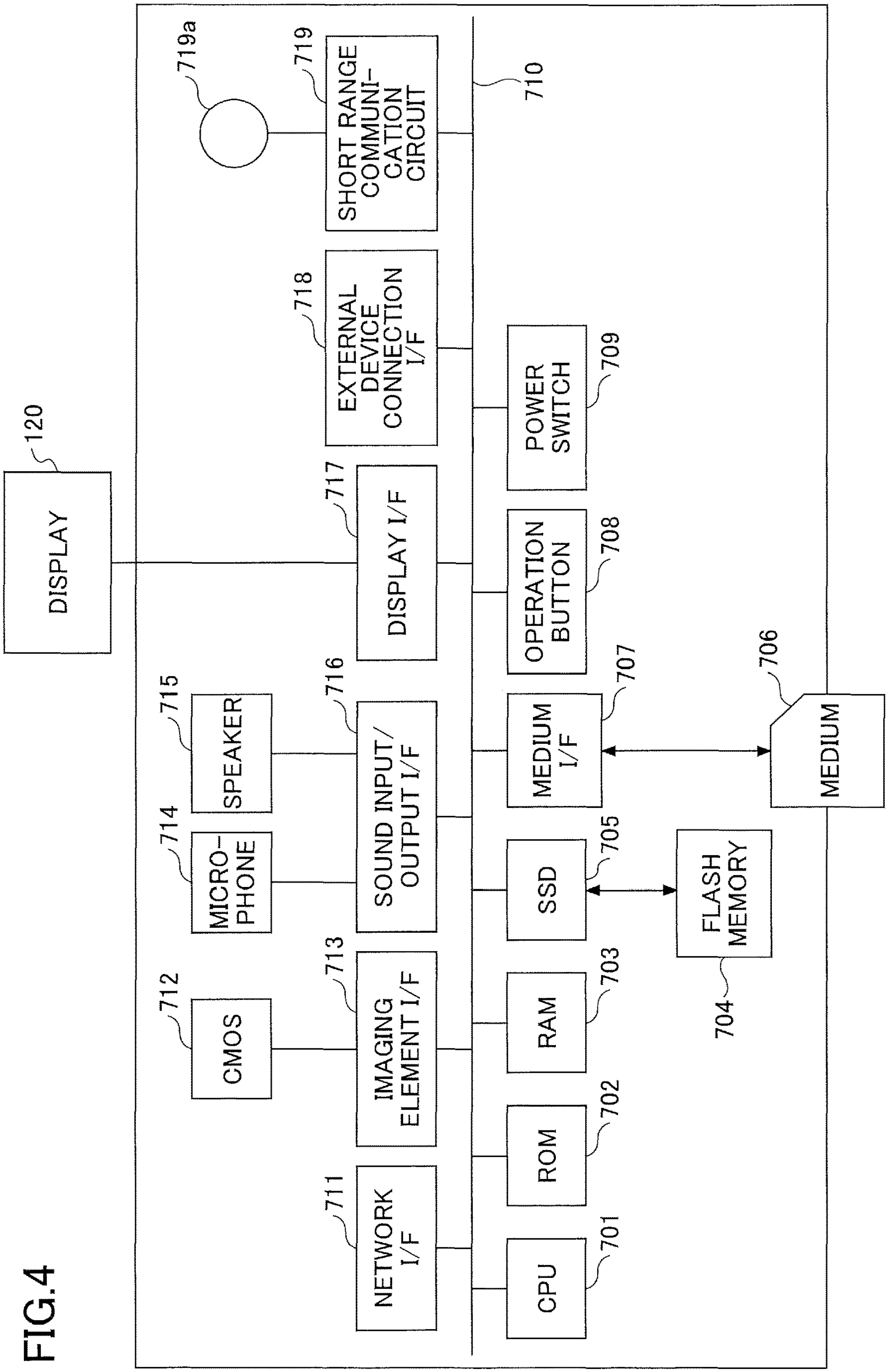
FIG. 4 is an example of a hardware configuration diagram of a communication terminal according to the first embodiment of the present invention.

FIG. 4 is a hardware configuration diagram of the communication terminal 10 according to an embodiment of the present invention. FIG. 4 illustrates a case in which the communication terminal 10 is a terminal exclusively used for the communication system 1. As illustrated in FIG. 4, the communication terminal 10 includes a central processing unit (CPU) 701, a read-only memory (ROM) 702, a random access memory (RAM) 703, a flash memory 704, a Solid State Drive (SSD) 705, a medium interface (I/F) 707, an operation button 708, a power switch 709, a bus line 710, a network I/F 711, a complementary metal-oxide semiconductor (CMOS) sensor 712, an imaging element I/F 713, a microphone 714, a speaker 715, a sound input/output I/F 716, a display I/F 717, an external device connection I/F 718, a short range communication circuit 719, and an antenna 719*a* of the short range communication circuit 719. Among these, the CPU 701 controls the operation of the entire communication terminal 10. The ROM 702 stores a program used to drive the CPU 701, such as an Initial Program Loader (IPL). The RAM 703 is used as the work area of the CPU 701. The flash memory 704 stores various kinds of data, such as a communication programs, image data, and voice data. The SSD 705 controls the reading or writing of various kinds of data to the flash memory 704 in accordance with the control of the CPU 701. A hard disk drive (HDD) may be used instead of the SSD. The medium I/F 707 controls the reading or writing (storage) of data to a recording medium 706, such as a flash memory. The operation button 708 is a button which is operated when selecting the destination of the communication terminal 10. The power switch 709 is a switch for switching the power of the communication terminal 10 on and off.

The network I/F 711 is an interface for performing data communication using the communication network 2 such as the Internet. The CMOS sensor 712 is a type of built-in imaging means that captures an image of a subject according to the control of the CPU 701 to obtain image data. The imaging means may be a Charge Coupled Device (CCD) sensor and the like, instead of a CMOS sensor. The imaging element I/F 713 is a circuit that controls the driving of the CMOS sensor 712. The microphone 714 is a built-in circuit that converts sound to an electrical signal. The speaker 715 is a built-in circuit that converts electrical signals into physical vibrations to generate sound, such as music and voice sound. The sound input/output I/F 716 is a circuit that processes the input and output of sound signals between the microphone 714 and the speaker 715 according to the control of the CPU 701. The display I/F 717 is a circuit that transmits image data to an external display 120 according to the control of the CPU 701. The external device connection I/F 718 is an interface for connecting various external devices. The short range communication circuit 719 is a communication circuit such as a Near Field Communication (NFC) or Bluetooth (registered trademark).

The bus line 710 is an address bus, a data bus, or the like for electrically connecting elements such as the CPU 701 illustrated in FIG. 4.

The display 120 is a type of display means configured by a liquid crystal display or an organic Electro Luminescence (EL) display for displaying an image of a subject or an operation icon. The display 120 is also connected to the display I/F 717 by a cable. The cable may be a cable for analog Red, Green, Blue (RGB) (Video Graphics Array (VGA)) signals, a cable for a component video, or a cable for High-Definition Multimedia Interface (HDMI) (registered trademark) or Digital Video Interactive (DVI) signals.

The CMOS sensor 712 is a type of built-in imaging means that captures an image of a subject according to the control of the CPU 701 to obtain image data. The imaging means may be a Charge Coupled Device (CCD) sensor and the like, instead of a CMOS sensor. External devices such as an external camera, an external microphone, and an external speaker can be connected to the external device connection I/F 718 by a Universal Serial Bus (USB) cable. When an external camera is connected, the external camera is driven with priority over the built-in CMOS sensor 712 according to the control of the CPU 701. Similarly, when an external microphone is connected or an external speaker is connected, the external microphone or external speaker is driven with priority over the built-in microphone 714 or the built-in speaker 715, respectively, according to the control of the CPU 701.

The recording medium 706 has a detachable configuration with respect to the communication terminal 10. Further, the non-volatile memory for reading or writing data according to the control of the CPU 701 is not limited to the flash memory 704, and an Electrically Erasable Programmable Read-Only Memory (EEPROM) or the like may be used.

<<Hardware Configuration of Transmission Management Apparatus, Relay Apparatus, and Communication Terminal According to the First Embodiment>>

Figure 5:
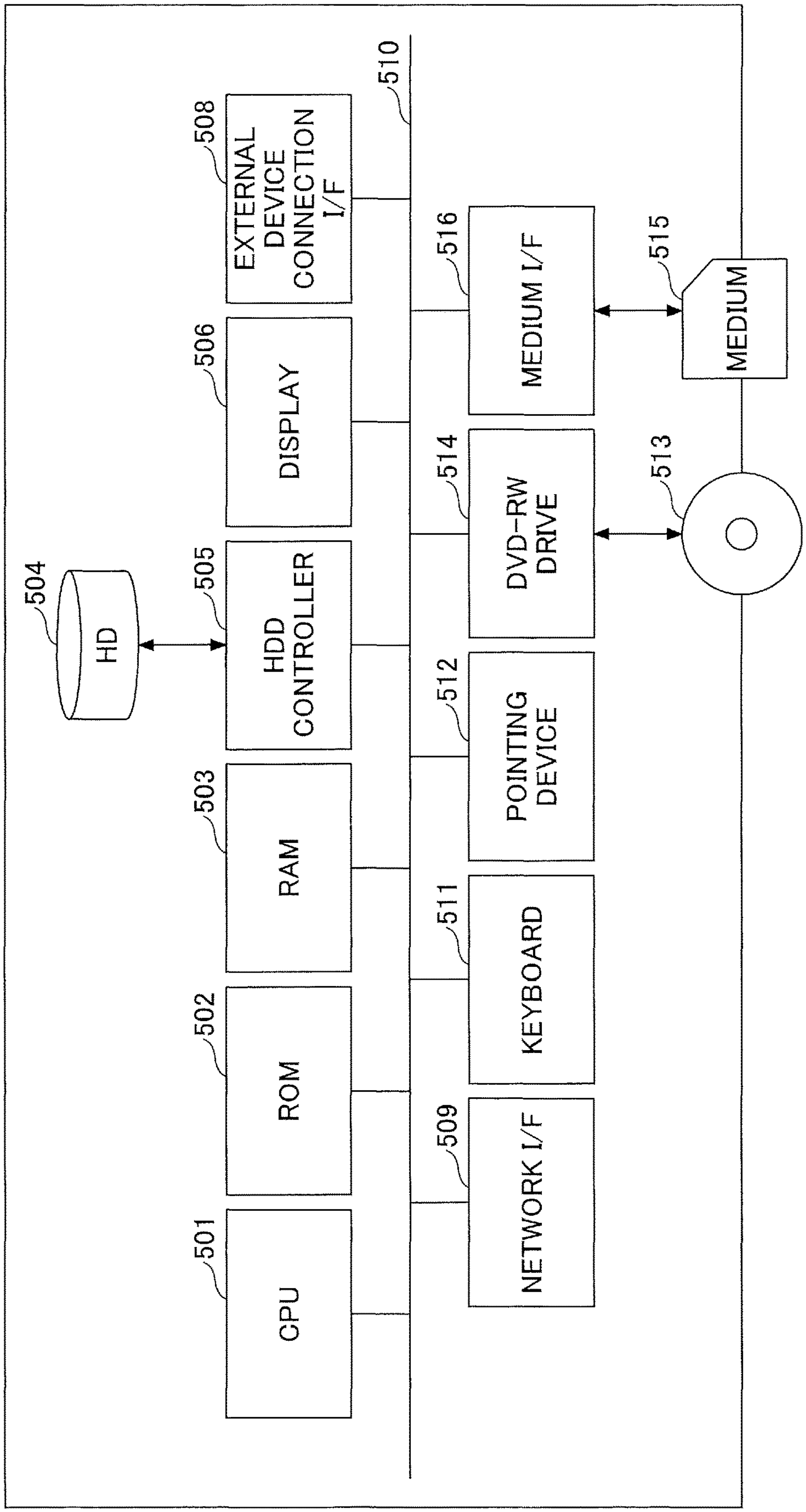
FIG. 5 is an example of a typical computer hardware configuration diagram according to the first embodiment of the present invention.

FIG. 5 is a hardware configuration diagram of a typical computer. In the case where the communication terminal 10 is a general-purpose terminal, the hardware configuration illustrated in FIG. 5 may be used. Here, there is provided a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a Digital Versatile Disk Rewritable (DVD-RW) drive 514, and a medium I/F 516, as illustrated in FIG. 5.

Among these, the CPU 501 controls the operation of the entire computer. The ROM 502 stores a program used to drive the CPU 501, such as an IPL. The RAM 503 is used as the work area of the CPU 501. The HD 504 stores various kinds of data such as a program. The HDD controller 505 controls the reading or writing of various kinds of data to the HD 504 according to the control of the CPU 501. The display 506 displays various kinds of information such as a cursor, menus, windows, characters, or images. The external device connection I/F 508 is an interface for connecting various external devices. In this case, the external device may be, for example, a USB (Universal Serial Bus) memory or a printer. The network I/F 509 is an interface for performing data communication using the communication network 2. The bus line 510 is an address bus, a data bus, or the like for electrically connecting elements such as the CPU 501 illustrated in FIG. 5.

The keyboard 511 is a type of input means with a plurality of keys for inputting characters, numbers, various instructions, and the like. The pointing device 512 is a type of input means for selecting and executing various instructions, selecting a processing target, moving a cursor, and the like. The DVD-RW drive 514 controls the reading or writing of various kinds of data to a DVD-RW 513 as an example of a removable recording medium. The removable recording medium is not limited to a DVD-RW, but may be a Digital Versatile Disc Recordable (DVD-R), etc. The medium I/F 516 controls the reading or writing (storage) of data to a recording medium 515, such as a flash memory.

<Functions According to the First Embodiment>

Figure 6:
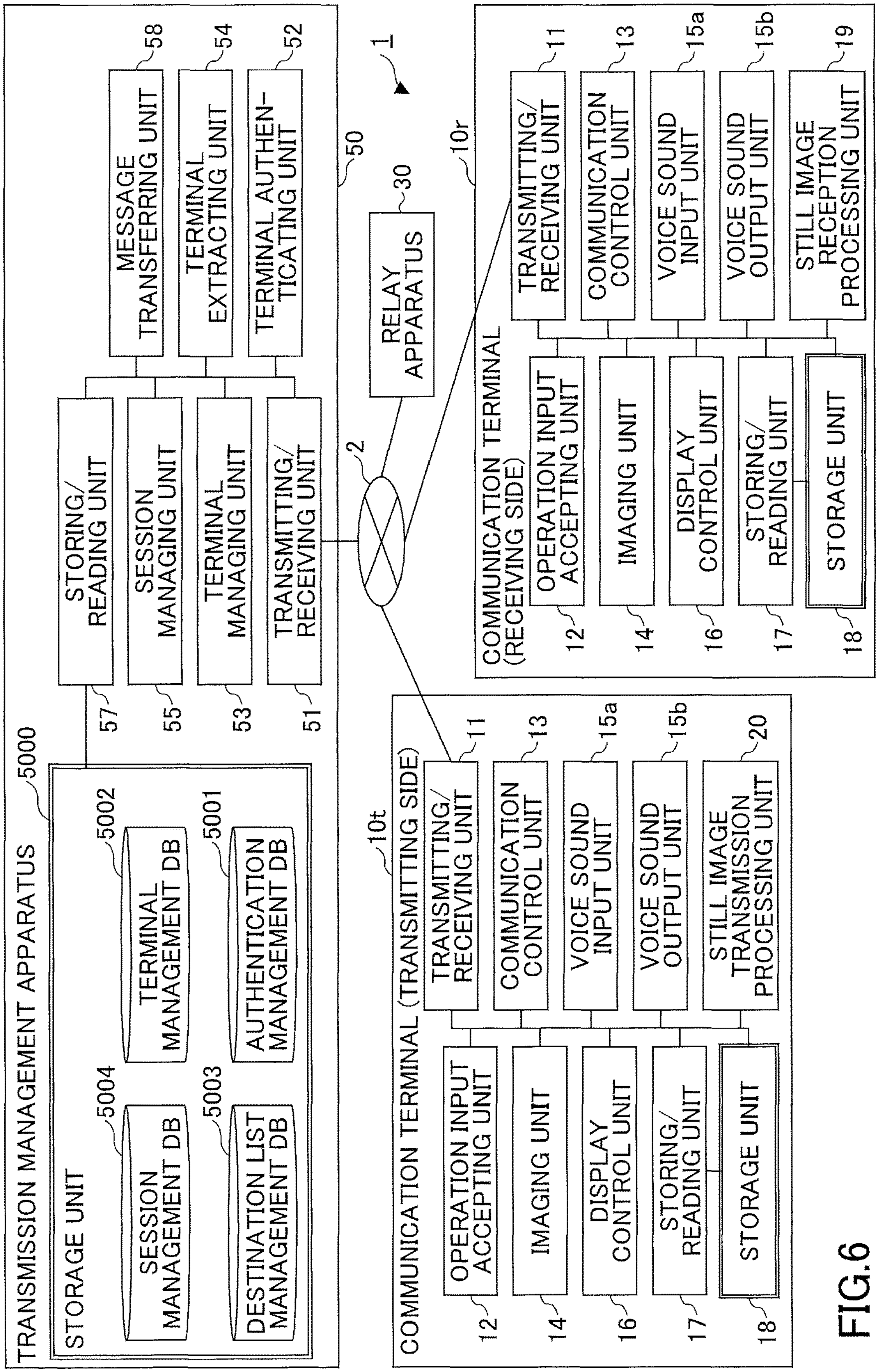
FIG. 6 is a functional block diagram illustrating functions of a transmission management apparatus, a communication terminal on the transmitting side, and a communication terminal on the receiving side included in a communication terminal illustrated as block shapes according to the first embodiment of the present invention.

Next, the functions of the communication system will be described with reference to FIG. 6. FIG. 6 is a functional block diagram illustrating functions of the transmission management apparatus 50, the communication terminal 10*t* on the transmitting side, and the communication terminal 10*r* on the receiving side that are included in the communication system 1, illustrated as block shapes. The functions of the relay apparatus 30 will be described as necessary. Although there are a plurality of the communication terminals 10*r* on the receiving side, only one is illustrated in FIG. 6.

<<Functional Configuration of Communication Terminal on Transmitting Side According to the First Embodiment>>

The communication terminal 10*t* on the transmitting side includes a transmitting/receiving unit 11, an operation input accepting unit 12, a communication control unit 13, an imaging unit 14, a voice sound input unit 15*a*, a voice sound output unit 15*b*, a display control unit 16, a storing/reading unit 17, and a still image transmission processing unit 20. Each of these units is a function or means that is implemented by the elements illustrated in FIG. 4 being operated by instructions from the CPU 701 in accordance with a program for the communication terminal 10 loaded from the flash memory 704 to the RAM 703. The communication terminal 10 on the transmitting side includes a storage unit 18 implemented by the RAM 703 illustrated in FIG. 4 and the flash memory 704 illustrated in FIG. 4.

The transmitting/receiving unit 11 transmits and receives various kinds of data (or information) to and from the other communication terminals 10, apparatuses, or systems via the communication network 2. The transmitting/receiving unit 11 starts receiving each piece of state information representing the status of each communication terminal 10 as the destination candidate from the transmission management apparatus 50 before starting a call with the desired destination terminal. The state information indicates not only the operation state (the state of online or the state of offline) of each communication terminal 10, but also, in the case of online, a detailed state such as whether a call is possible or a call is in progress.

The operation input accepting unit 12 accepts various inputs to the communication terminal 10 by a user. For example, when the user performs an operation to turn on the power of the communication terminal 10, the operation input accepting unit 12 accepts the operation and controls the power to be turned on. Further, the operation input accepting unit 12 accepts various operations including input of information to the communication terminal 10.

The communication control unit 13, for example, upon being triggered by accepting the power on operation described above, automatically transmits log in request information indicating that log in is requested and the current Internet Protocol (IP) address of the request source terminal, from the transmitting/receiving unit 11 to the transmission management apparatus 50 via the communication network 2. In a case where the communication terminal 10 is a general-purpose terminal, the activation of the application software or the web browser or the user's log in operation thereto may be the trigger. When the user performs the operation of turning off the power of the communication terminal 10, after the transmitting/receiving unit 11 transmits the state information indicating that the power is turned off to the transmission management apparatus 50, the communication terminal 10 turns the power off. Accordingly, it is possible for the transmission management apparatus 50 side to recognize that the communication terminal 10 has switched to power off from the power on. In a case where the communication terminal 10 is a general-purpose terminal, the termination of the application software or the web browser or the user's log off operation thereto may be the trigger.

The communication control unit 13 performs various kinds of communication control such as establishment of a session in which the content data is transmitted to and received from the other communication terminals 10 and disconnection thereof via the relay apparatus 30. The communication control unit 13 according to the present embodiment transmits data to the transmission management apparatus 50 upon including, in the data to be transmitted, the communication ID (identification) of the communication terminal 10.

The communication ID is an example of the identification information of an account that can participate in the session in which the content data is transmitted and received using the communication terminal 10. The communication ID may be, for example, a user ID that is the user's identification information, an application ID that is the application's identification information, and a contract ID that is the identification information of the contractor of the communication terminal 10. The communication ID includes information that is a combination of at least two items of characters, numbers, symbols, and various indications.

Alternatively, a mail address and the like may be used.

The imaging unit 14 converts the captured image data obtained by capturing an image of a subject into predetermined image data and outputs the image data obtained by the conversion. The communication terminal 10 may include a plurality of imaging units 14.

The voice sound input unit 15*a* converts a voice sound signal, which has been obtained converting a user's voice sound by the microphone 114, into predetermined voice sound data, and outputs the voice sound data. The voice sound output unit 15*b* converts the voice sound data into a voice sound signal and outputs the voice sound signal to the speaker 715 to be output from the speaker 715.

The display control unit 16 displays, on the display 120, for example, image data included in content data received by the communication terminal 10. Further, the display control unit 16 can display, on the display 120, information of a destination list received from the transmission management apparatus 50.

The still image transmission processing unit 20 performs a process related to the transmission of the still image data in the still image sharing. The details will be described in FIG. 7.

The storing/reading unit 17 performs processes for storing various kinds of data in the storage unit 18 or for reading various kinds of data stored in the storage unit 18.

The storage unit 18 stores, for example, authentication information such as the communication ID described above a password corresponding to the communication ID. Every time image data and voice sound data are received when a call is made with a destination terminal, the image data and voice sound data are overwritten and stored in the storage unit 18. Among these, an image is displayed on the display 120 by the image data before being overwritten, and voice sound is output from the speaker 715 by the voice sound data before being overwritten.

<<Functional Configuration of Communication Terminal on Receiving Side According to the First Embodiment>>

The function of the communication terminal 10*r* on the receiving side may be the same as that of the communication terminal 10*t* on the transmitting side except that the communication terminal 10*r* on the receiving side includes a still image reception processing unit 19. The still image reception processing unit 19 will be described with reference to FIG. 7. Actually, the communication terminal 10*t* on the transmitting side also includes the still image reception processing unit 19, and the communication terminal 10*r* on the receiving side also includes the still image transmission processing unit 20; however, these are omitted in FIG. 6 as a matter of convenience of explanation.

<<Functional Configuration of Transmission Management Apparatus According to the First Embodiment>>

The transmission management apparatus 50 includes a transmitting/receiving unit 51, a terminal authenticating unit 52, a terminal managing unit 53, a terminal extracting unit 54, a session managing unit 55, a message transferring unit 58, and a storing/reading unit 57. Each of these units is a function or a means that is implemented by the elements illustrated in FIG. 5 being operated by an instruction from the CPU 501 in accordance with a program for the transmission management apparatus 50 loaded from the HD 504 to the RAM 503. The transmission management apparatus 50 includes a storage unit 5000 implemented by the HD 504 and the like illustrated in FIG. 5.

<Each Functional Configuration of the Transmission Management Apparatus According to the First Embodiment>

Next, each functional configuration of the transmission management apparatus 50 will be described in detail. The transmitting/receiving unit 51 transmits and receives various kinds of data (or information) to and from the communication terminal 10, apparatuses, or systems via the communication network 2.

The terminal authenticating unit 52 authenticates the communication terminal 10 by determining whether a combination of the communication ID and the password included in the log in request information received via the transmitting/receiving unit 51 is included in an authentication management database (DB) 5001.

The terminal managing unit 53 stores and manages the destination name, the operation state, the date and time of receipt of the request information, the IP address of the request source terminal and the like of each communication ID in a terminal management DB 5002. For example, based on state information indicating that the power is turned off transmitted from the communication terminal 10 when the user switches the power of the communication terminal 10 from on to off, the terminal managing unit 53 changes the operation state stored in the terminal management DB 5002 from online to offline.

The terminal extracting unit 54 searches a destination list management DB 5003 using the communication ID of the request source terminal that has requested log in as the key, and extracts the communication ID of the destination terminal that can make a call with the request source terminal. Further, the terminal extracting unit 54 searches the destination list management DB 5003 and extracts the communication ID of another communication terminal 10 for which the communication ID of the request source terminal is registered as the candidate of a destination terminal.

Further, the terminal extracting unit 54 searches the above-described terminal management DB 5002 by using the communication ID of the extracted destination terminal candidate as the search key and reads the operation state for each extracted communication ID. Therefore, the terminal managing unit 53 can acquire the operation state of the destination terminal candidate that can make a call with the request source terminal that has requested to log in. Further, the terminal managing unit 53 searches the terminal management DB 5002 by using the communication ID of the request source as the search key and acquires the operation state of the request source terminal that has requested to log in.

The session managing unit 55 controls the session managed by the transmission management apparatus 50. The control of the session includes, for example, control for establishing the session, control for causing the communication terminal 10 to participate in the established session, control for disconnecting the session, generation of the session ID, and the like. The session managing unit 55 stores and manages the communication ID of the communication terminal 10 requesting the start of a session and the communication ID of the destination terminal in a session management DB 5004 in association with the session ID that is the session identification information.

The message transferring unit 58 transfers a message transmitted from each communication terminal 10 to another communication terminal 10. This message includes a share completion report and share status report.

The storing/reading unit 57 is implemented by an instruction from the CPU 501 and the HD 504 illustrated in FIG. 5 or implemented by an instruction from the CPU 501. The storing/reading unit 57 stores various kinds of data in the storage unit 5000 and reads various kinds of data from the storage unit 5000.

<Example of Information Managed by the Transmission Management Apparatus According to the First Embodiment>

Each management DB stored in the storage unit 5000 of the transmission management apparatus 50 will be described.[Table 1]

AUTHENTICATION MANAGEMENT TABLE

| COMMUNICATION ID | PASSWORD |
|---|---|
| 01aa | aaaa |
| 01bb | abab |
| 01cc | baba |

The authentication management DB 5001 stored in the storage unit 5000 of the transmission management apparatus 50 includes, for example, an authentication management table 602 as indicated in Table 1. In the authentication management table 602, the communication ID of the communication terminal 10 managed by the transmission management apparatus 50 and the password corresponding to the communication ID are managed in association with each other. For example, in the authentication management table 602 indicated in Table 1, the password of the communication terminal 10 having the communication ID of “01aa”, is “aaaa”.

TABLE 2

TERMINAL MANAGEMENT TABLE

| COMMUNICATION ID | DESTINATION NAME | OPERATION STATE | RECEPTION DATE AND TIME | IP ADDRESS OF TERMINAL |
|---|---|---|---|---|
| 01aa | HEAD OFFICE, JAPAN | ONLINE (COMMUNICATION POSSIBLE) | 20xx.4.10 13:40 | 1.2.1.3 |
| 01bb | FIRST RESEARCH LABORATORY, USA | ONLINE (COMMUNICATION POSSIBLE) | 20xx.4.10 13:40 | 1.2.1.4 |
| 01cc | NY COMPANY STORE, USA | ONLINE (COMMUNICATION POSSIBLE) | 20xx.4.10 9:50 | 1.2.1.5 |
| 01dd | FIRST FACTORY, CHINA | ONLINE (IN COMMUNICATION) | 20xx.4.10 11:42 | 1.2.1.5 |
| . . . | . . . | . . . | . . . | . . . |

The terminal management DB 5002 stored in the storage unit 5000 of the transmission management apparatus 50 includes, for example, a terminal management table 603 as indicated in Table 2. In the terminal management table 603, for each communication ID of the communication terminal 10, the destination name when each communication terminal 10 is used as a destination, the operation state of each communication terminal 10, the reception date and time when the log in request information described later is received by the transmission management apparatus 50, and the IP address of the communication terminal 10 are managed in association with each other. For example, in the terminal management table 603 indicated in Table 2, the communication terminal 10 having the communication ID of “01aa” is indicated to have the terminal name of “Head Office, Japan” and to have an operation state of “online (communication possible)”. With respect to the communication terminal 10 having the communication ID of “01aa”, it is indicated that “13:40 on April 10, 20xx” is the date and time when the log in request information has been received by the transmission management apparatus 50, and that the IP address is “1.2.1.3”.

TABLE 3

DESTINATION LIST MANAGEMENT TABLE

| COMMUNICATION ID OF REQUEST SOURCE TERMINAL | COMMUNICATION ID OF DESTINATION TERMINAL CANDIDATE |
|---|---|
| 01aa | 01bb, 01cc, 01dd |
| 01bb | 01aa |
| 01cc | 01aa |
| 01dd | 01aa |
| . . . | . . . |
| 01db | 01ab, 01ba, . . . , 01da, 01ca, 01cb, . . . , 01da |

The destination list management DB 5003 stored in the storage unit 5000 of the transmission management apparatus 50 includes, for example, a destination list management table 604 indicated in Table 3. In the destination list management table 604, the communication IDs of the destination terminals registered as destination terminal candidates are all managed in association with the communication ID of the request source terminal requesting the start of communication in a video conference (or a TV conference). For example, in the destination list management table 604 indicated in Table 3, the destination terminal candidates that can request the start of communication from the request source terminal having the communication ID of “01aa”, are the communication terminals 10 having the communication IDs of “01bb”, “01cc”, and “01dd”. The destination terminal candidate is updated by having a destination terminal candidate added or deleted by the transmission management apparatus 50 in response to a request for addition or deletion from any request source terminal to the transmission management apparatus 50.

According to such a configuration, the request source terminal (for example, 01aa) can only start communication with the destination terminal candidate (for example, 01bb) that is registered in advance. Also, this destination terminal (for example, 01bb) cannot communicate with the request source terminal (for example, 01aa) unless the request source terminal (for example, 01aa) is registered in advance as the destination terminal in the destination list management table 604. Such a mechanism is preferable in that the possibility of communication between the communication terminals 10 that are not supposed to communicate with each other, can be reduced. However, the communication terminals 10 may freely communicate with each other without requiring registration in the destination list management table 604.

completion determining unit 25 (the share completion determiner), and a share status reporting unit 26.

The share processing unit 23 creates a still image by importing a screen and uploads still image data. At least two pieces of still image data having different file sizes are created at the request of the operation input accepting unit 12 and are uploaded to the relay apparatus 30. The at least two pieces of still image data of different file sizes include a high-definition image and a low-quality image. For example, by creating two pieces of still image data, when the network band of the communication terminal 10*r* on the receiving side has a small bandwidth, the communication terminal 10*r* on the receiving side can download the low-quality image. The high-definition image may be generated by importing the screen at the resolution of the shared file or the resolution of the screen, and the low-quality image may be generated by compressing the high-definition image or reducing the number of pixels of the high-definition image.

The message transmitting unit 21 transmits a message that still image sharing has started and the share status to the transmission management apparatus 50.

TABLE 4

SESSION MANAGEMENT TABLE

| SESSION ID | RELAY APPARATUS ID | COMMUNICATION ID OF REQUEST SOURCE TERMINAL | COMMUNICATION ID OF DESTINATION TERMINAL | CONFERENCE ID | SESSION PARTICIPATION DATE AND TIME |
|---|---|---|---|---|---|
| se1 | 111a | 01aa | 01bb | k01 | 20xx/04/10 13:45:30 |
| se2 | 111b | 01cc | 01aa | k01 | 20xx/04/10 13:50:30 |
| se3 | 111a | 01ad | 01ca | k02 | 20xx/04/10 13:11:11 |
| . . . | . . . | . . . | . . . | . . . | . . . |

The session management DB 5004 stored in the storage unit 5000 of the transmission management apparatus 50 includes, for example, a session management table 605 as indicated in Table 4. The session management table 605 manages information such as the relay apparatus ID of the relay apparatus 30 used for relay, the communication ID of the request source terminal, the communication ID of the destination terminal, the conference ID, and the session participation date and time for each session ID that is the identification information of a session. For example, in the session management table 605 indicated in Table 4, it is indicated that the session having the session ID "se1" is performed between the communication ID "01aa" of the request source terminal and the communication ID "01bb" of the destination terminal. Further, the session performed by the session ID "se1" and the session ID "se2" have a conference ID of "k01", and, therefore, it can be recognized that three sites are holding the same conference.

<<Functions of Still Image Transmission Processing Unit and Still Image Reception Processing Unit According to the First Embodiment>>

Figure 7:
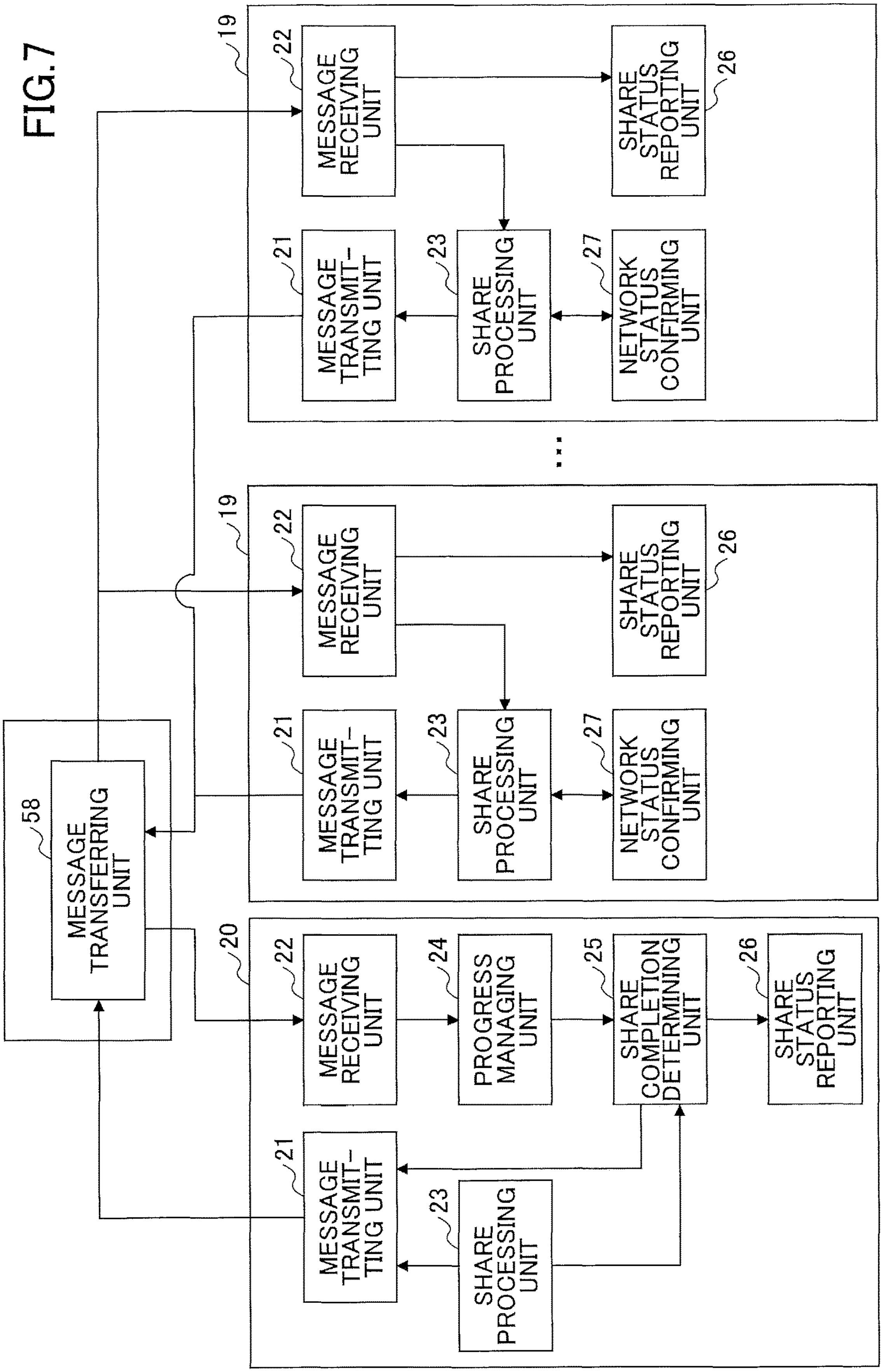
FIG. 7 is an example of a functional block diagram describing the functions of a still image transmission processing unit and a still image reception processing unit divided into blocks according to the first embodiment of the present invention.

FIG. 7 is an example of a functional block diagram illustrating the functions of the still image transmission processing unit 20 and the still image reception processing unit 19 divided into blocks.

First, the still image transmission processing unit 20 includes a message transmitting unit 21, a message receiving unit 22, a share processing unit 23 (the first share processor), a progress managing unit 24 (the progress manager), a share The message receiving unit 22 receives the report (message) transmitted from the message transmitting unit 21 of the communication terminal 10*r* on the receiving side.

The progress managing unit 24 manages the progress of the share status of the communication terminal 10*r* on the receiving side upon receipt of a share completion report transmitted by the communication terminal 10*r* on the receiving side. The progress managing unit 24 transmits a report that the communication terminal 10*r* on the receiving side has completed the sharing, to the share completion determining unit 25.

The share completion determining unit 25 determines whether all of the communication terminals 10*r* on the receiving side have completed the still image sharing. Further, the share completion determining unit 25 includes a timer function, and when the still image sharing is not completed within the predetermined time period from the start of the still image sharing process, the share completion determining unit 25 requests the message transmitting unit 21 to transmit a share status report that it is taking time for the sharing to be completed.

The share status reporting unit 26 reports, to the user of the communication terminal 10*t* on the transmitting side, the progress of the still image sharing. The number of communication terminals 10*r* on the receiving side that have completed the sharing is reported by characters, voice sound guidance, sound, etc.

On the other hand, the communication terminal 10*r* on the receiving side includes the message transmitting unit 21, the message receiving unit 22, the share processing unit 23 (the second share processor), the share status reporting unit 26 (the share status reporter), and a network status confirming unit 27.

The share processing unit 23 requests the network status confirming unit 27 to confirm the network status and downloads the still image data of a size suitable for the network status from the relay apparatus 30. When the downloading is completed, the share processing unit 23 requests the message transmitting unit 21 to transmit a share completion report.

When the share processing unit 23 completes the reception of the still image data, the message transmitting unit 21 transmits the share completion report to the message transferring unit 58. The message receiving unit 22 receives a message that the still image sharing has started and the share status report, etc., from the message transferring unit 58.

The network status confirming unit 27 confirms the network band of the own site and returns the confirmation result to the share processing unit 23. The network band (bandwidth) is mainly correlated with the communication speed and refers to how much data can be transmitted or received in a unit time. For example, the network band (bandwidth) is indicated by bits per second [bps]. For example, the network band (bandwidth) for transmission and reception of images at each site is periodically recorded, and the average value in the past predetermined time, etc., is used as the value of the network band (bandwidth). Alternatively, the network status may be determined by the time from when a PING command is transmitted to the relay apparatus 30 until a response is returned.

The share status reporting unit 26 reports, to the user, the share status of the still image sharing. The share status reporting unit 26 also reports a message that an explanation about the shared data will start.

<Operation Procedure Until Communication Starts According to the First Embodiment>

Next, the flow of the process of the communication system 1 will be described.

<Process at Preparation Stage According to the First Embodiment>

Figure 8:
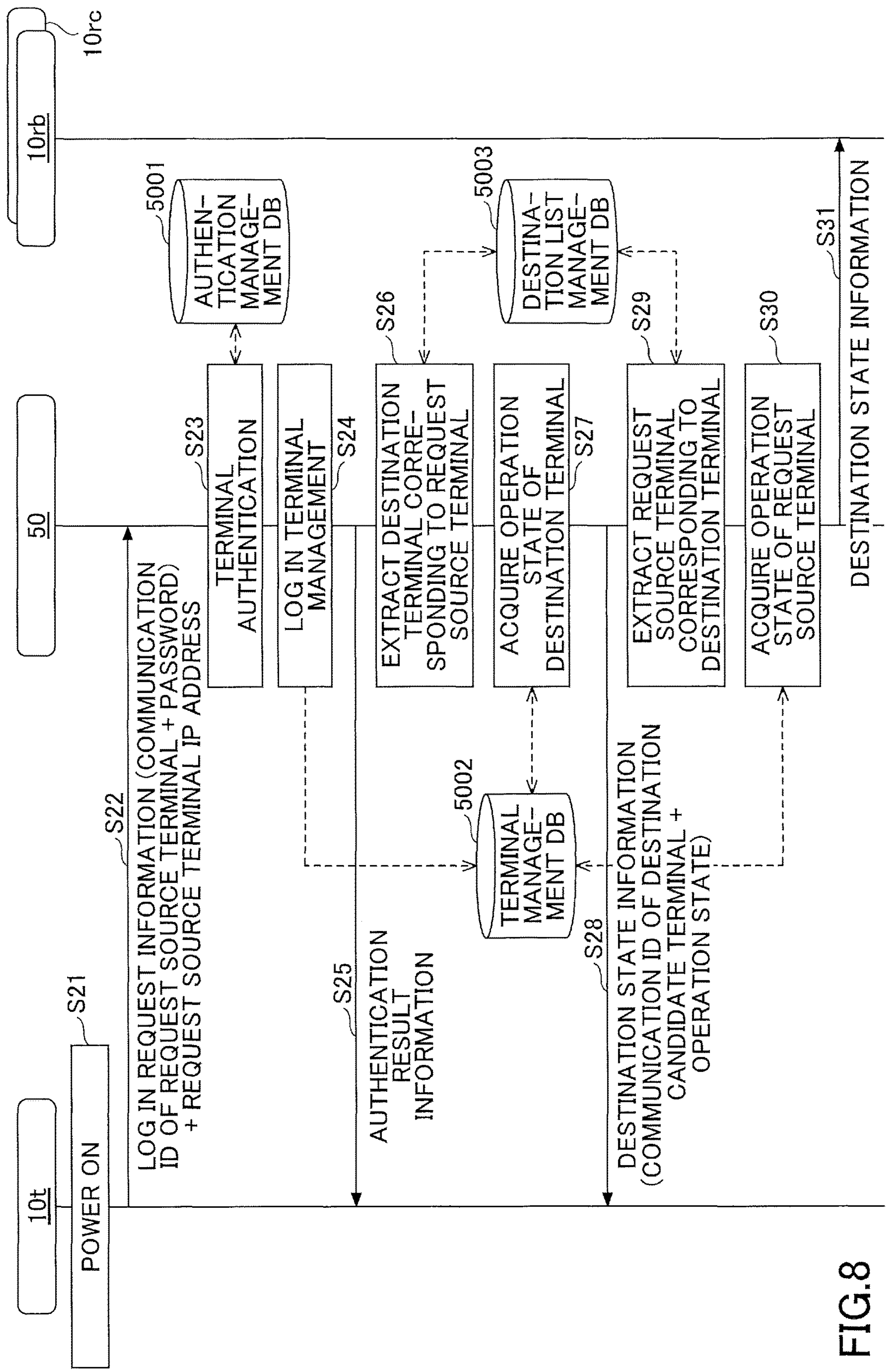
FIG. 8 is a sequence diagram illustrating an example of a process in the preparation stage of communication of a communication system according to the first embodiment of the present invention.

FIG. 8 is a sequence diagram illustrating an example of a process in the preparation stage of communication of the communication system 1. Here, as an example, the process in the preparation stage before starting the session between the communication terminal 10*t* and the communication terminals 10*rb* and 10*rc* will be described. Note that it is assumed that the communication ID of the communication terminal 10*t* is "01aa", the communication ID of the communication terminal 10*rb* is "01bb", and the communication ID of the communication terminal 10*rc* is "01cc" in the following description.

First, in step S21, when the user of the communication terminal 10*t* as the request source terminal performs an operation to turn on the power of the communication terminal 10*t*, for example, the operation input accepting unit 12 accepts the operation to turn on the power and turns on the power of the communication terminal 10*t*.

In step S22, the communication control unit 13 transmits log in request information requesting to log in, from the transmitting/receiving unit 11 to the transmission management apparatus 50 via the communication network 2 upon being triggered by the above-described power on. The log in request information is transmitted by an operation of turning on the power of the communication terminal 10*t*, in one example. In other examples, the log in request information may be transmitted by an operation to the input device 108 by an operator, or by activating an application.

The log in request information includes a communication ID (communication ID of the request source terminal) for identifying the communication terminal 10*t* that is the request source and the own device, and a password. The communication ID and the password are, for example, information read from the storage unit 18 via the storing/reading unit 17. When the log in request information is transmitted from the communication terminal 10*t* to the transmission management apparatus 50, the transmission management apparatus 50 which is the receiving side can recognize the IP address of the communication terminal 10*t* on the transmitting side.

Next, the terminal authenticating unit 52 of the transmission management apparatus 50 searches the authentication management table 602 by using, as the search key, the communication ID and the password included in the log in request information received via the transmitting/receiving unit 51. In step S23, the terminal authenticating unit 52 performs authentication according to whether the combination of the communication ID and the password included in the log in request information received from the communication terminal 10*t* is included in the authentication management table 602.

When it is determined by the terminal authenticating unit 52 that the log in request is from the communication terminal 10*t* having the legitimate usage right, the terminal managing unit 53 changes the operation state of the communication ID "01aa" of the communication terminal 10*t* recorded in the terminal management table 603 to "online (communication possible)". At this time, in step S24, the terminal managing unit 53 updates the reception date and time and updates the IP address of the communication terminal 10 as necessary. Accordingly, in the terminal management table 603, the communication ID "01aa" of the communication terminal 10*t*, the operation state "online (communication possible)", the reception date and time "20xx.4.10.13:40", and the IP address "1.2.1.3" of the communication terminal 10*t*, are managed in association with each other.

In step S25, the transmitting/receiving unit 51 of the transmission management apparatus 50 transmits authentication result information representing the authentication result obtained by the terminal authenticating unit 52 to the communication terminal 10*t* that is the request source terminal that has requested to log in, via the communication network 2. Hereinafter, a case in which the terminal authenticating unit 52 has determined that the communication terminal 10 has the legitimate usage right, will be described below.

The terminal extracting unit 54 of the transmission management apparatus 50 searches the destination list management table 604 by using, as the search key, the communication ID "01aa" of the request source terminal (the communication terminal 10*t*) that has requested to log in. Therefore, in step S26, the terminal managing unit 53 extracts the communication ID of the destination terminal candidate that can communicate with the request source terminal (the communication terminal 10*t*). Here, as an example, "01bb", "01cc", and "01dd" are extracted as the communication IDs of the destination terminals corresponding to the communication ID "01aa" of the request source terminal (the communication terminal 10*t*).

Next, the terminal extracting unit 54 searches the terminal management table 603 by using, as the search keys, the extracted communication IDs ("01bb", "01cc", and "01dd") of the destination terminal candidates. Accordingly, in step S27, each operation state of the communication ID ("01bb", "01cc", and "01dd") is acquired by reading the operation state of each extracted communication ID.

Next, in step S28, the transmitting/receiving unit 51 transmits the destination state information including the operation state of the communication ID ("01bb", "01cc", and "01dd") of the destination terminal candidate to the request source terminal (the communication terminal 10*t*). Thus, the request source terminal (the communication terminal 10*t*) can recognize the current operation state of the communication ID ("01bb", "01cc", and "01dd") that is a destination terminal candidate of this request source terminal (the communication terminal 10*t*).

The terminal extracting unit 54 of the transmission management apparatus 50 uses, as the search key, the communication ID "01aa" of the request source terminal (the communication terminal 10*t*) that has requested to log in, to search the destination list management table 604. In step S29, the terminal extracting unit 54 extracts the communication ID of another request source terminal for which the communication ID "01aa" of the request source terminal (the communication terminal 10*t*) is registered as the destination terminal candidate. In the destination list management table 604 indicated in Table 3, the extracted communication IDs of the other request source terminals are "01bb", "01cc", and "01dd".

Next, the terminal managing unit 53 of the transmission management apparatus 50 searches the terminal management table 603 by using, as the search key, the communication ID "01aa" of the request source terminal (the communication terminal 10*t*) that has requested to log in. Accordingly, in step S30, the terminal managing unit 53 acquires the operation state of the request source terminal (the communication terminal 10*t*) that has requested to log in.

The terminal managing unit 53 of the transmission management apparatus 50 extracts, from among the communication IDs ("01bb", "01cc", and "01dd") extracted in step S29, the communication IDs ("01bb", "01cc", and "01dd") for which the operation state is "online (communication possible)" in the terminal management table 603.

In step S31, the transmitting/receiving unit 51 transmits destination state information including the communication ID "01aa" and the operation state "online (communication possible)" of the request source terminal (the communication terminal 10*t*) to the communication terminals 10*rb* and 10*rc* corresponding to the extracted communication IDs ("01bb", "01cc").

On the other hand, the other communication terminals 10*rb* and 10*rc* perform the same processes as in the above-described steps S22 to S30 in response to, for example, an operation of turning the power on.

<Communication Process According to the First Embodiment>

Figure 9:
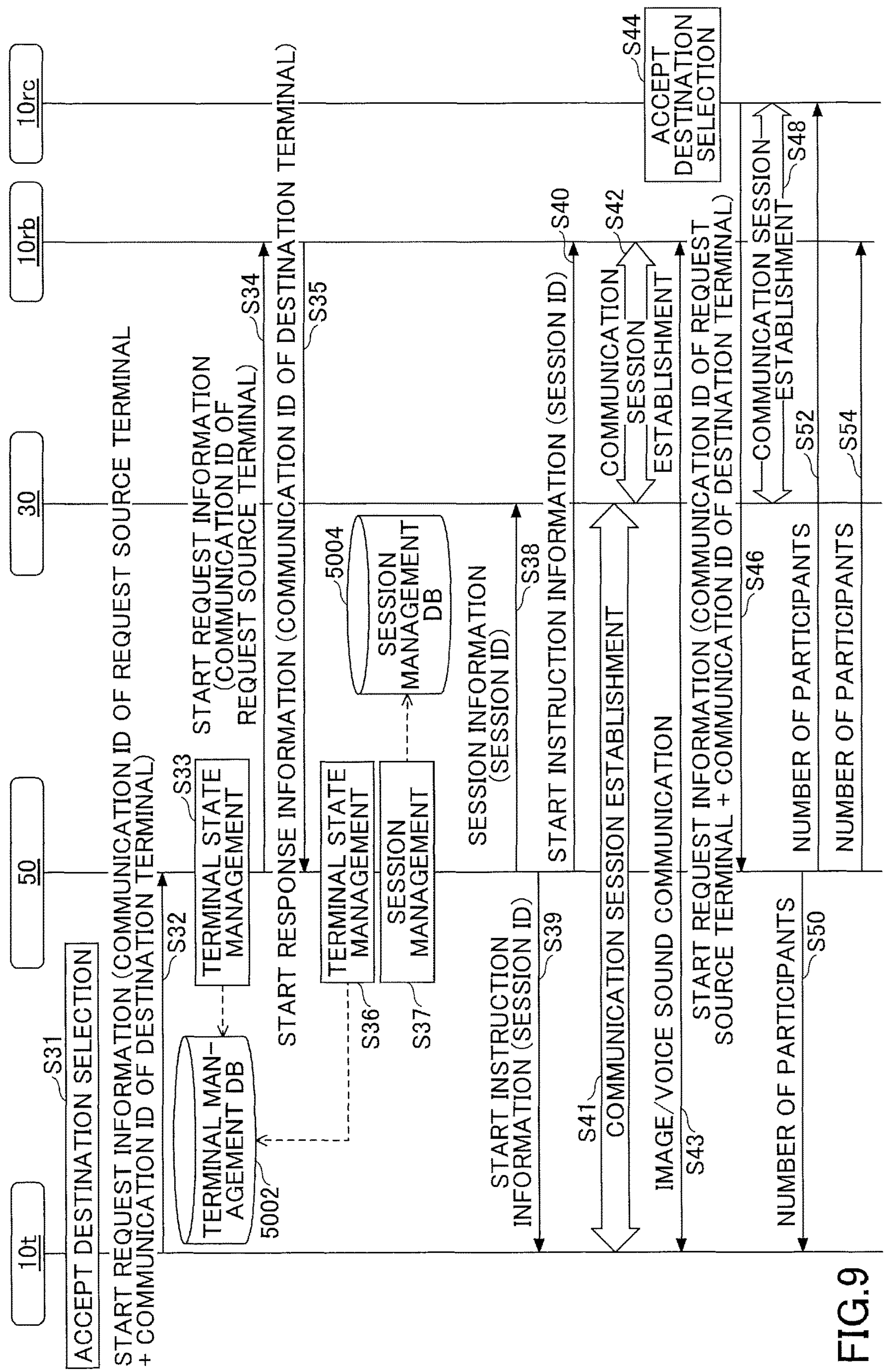
FIG. 9 is a sequence diagram illustrating an example of a communication process of a communication system according to the first embodiment of the present invention.

FIG. 9 is a sequence diagram illustrating an example of a communication process of the communication system 1. Here, an example of a communication management method for starting communication with the communication terminals 10*rb* and 10*rc* communicating with the communication terminal 10*t* will be described.

In step S31, the operation input accepting unit 12 of the communication terminal 10*t* accepts an operation of selecting the destination terminal (the communication terminal 10*rb*) by an operator of the communication terminal 10*t*.

In step S32, the transmitting/receiving unit 11 of the communication terminal 10*t* transmits start request information requesting the transmission management apparatus 50 to start a session. The start request information includes, for example, the communication ID of the request source terminal that is the communication ID of the communication terminal 10*t* that is the request source terminal and the communication ID of the destination terminal that is the communication ID of the communication terminal 10*rb* that is the destination terminal. The start request information also includes information such as the IP address (request source IP address) of the communication terminal 10*t*.

In step S33, the terminal managing unit 53 of the transmission management apparatus 50 that has received the start request information from the communication terminal 10*t*, updates the terminal management DB 5002 based on the communication ID "01aa" of the request source terminal (the communication terminal 10*t*) included in the start request information. For example, the terminal managing unit 53 changes the information of the operation state corresponding to the communication ID "01aa" of the communication terminal 10*t* to "online (in communication)" and updates the reception date and time information.

In step S34, the session managing unit 55 of the transmission management apparatus 50 transmits the start request information requesting to start a session, to the communication terminal 10*rb* that is the destination terminal. The start request information includes, for example, the communication ID of the request source terminal of the communication terminal 10*t* that is the request source terminal.

In step S35, the communication terminal 10*rb* that has received the start request information from the transmission management apparatus 50 transmits start response information to the transmission management apparatus 50. The start response information includes, for example, the communication ID of the destination terminal of the communication terminal 10*rb*. According to the present embodiment, the start response information is transmitted without the need for operation on the communication terminal 10*rb* side, but it is possible to apply a condition that the user operates the communication terminal 10*r*.

In step S36, the terminal managing unit 53 of the transmission management apparatus 50 that has received the start response information from the communication terminal 10*rb* updates the terminal management DB 5002 based on the communication ID "01bb" of the communication terminal 10*rb* included in the start response information. For example, the terminal managing unit 53 changes the information of the operation state corresponding to the communication ID "01bb" of the communication terminal 10*rb* to "online (in communication)" and updates the reception date and time information.

In step S37, the session managing unit 55 of the transmission management apparatus 50 assigns a session ID (se1) that is identification information for identifying a session. The session managing unit 55 stores the created session ID (se1) in the session management DB 5004 in association with the communication ID of the request source terminal (the communication ID of the communication terminal 10*t*) and the communication ID of the destination terminal (the communication ID of the communication terminal 10*rb*).

In step S38, the session managing unit 55 of the transmission management apparatus 50 transmits session information to the relay apparatus 30. The session information includes, for example, information such as the session ID created in step S37. The relay apparatus 30 can acquire the session information from the session management DB 5004 based on the session ID.

In step S39, the session managing unit 55 of the transmission management apparatus 50 transmits start instruction information instructing to start a session to the communication terminal 10*t*. Similarly, in step S40, the session managing unit 55 of the transmission management apparatus 50 transmits start instruction information instructing to start a session to the communication terminal 10*rb*. The start instruction information includes the session ID, and the communication terminal 10 can acquire the session information from the session management DB 5004 based on the session ID.

In step S41, the communication terminal 10*t* establishes a session with the relay apparatus 30 based on the received start instruction information. Similarly, in step S42, the communication terminal 10*rb* establishes a session with the relay apparatus 30 based on the received start instruction information. Accordingly, the communication terminals 10*t* and 10*rb* participate in the same session. That is, a communication service is started.

In step S43, the communication terminal 10*t* and the communication terminal 10*rb* can perform, for example, a video conference, by participating in the session having the same session ID and transmitting and receiving content data such as image data and voice sound data.

Similarly, in step S44, the operation input accepting unit 12 of the communication terminal 10*rc* accepts an operation of selecting the destination terminal (the communication terminal 10*t*) by an operator of the communication terminal 10*rc*.

In step S46, the transmitting/receiving unit 11 of the communication terminal 10*rc* transmits start request information requesting to start a session with the communication terminal 10*t*, to the transmission management apparatus 50. Thereafter, the processes described in FIG. 9 are executed, and a session is established in step S48, and the communication ID of the communication terminal 10*rc*, the communication ID of the communication terminal 10*t*, and an assigned session ID (se2) are registered in the session management table.

At the time of registration, the session managing unit 55 searches for the communication IDs (01cc, 01aa) of the communication terminals 10*rc* and 10*t* for which a session has been newly established, among the request source terminals or the destination terminals in the session management DB 5004, and searches for the conference in which the communication terminal 10*rc* is to participate. According to the present embodiment, the communication ID (01aa) is found in the session management DB 5004, and, therefore, the session managing unit 55 applies the same conference ID as the session ID (se1), to the session ID (se2). In this way, a conference can be held among the communication terminals 10*t*, 10*rb*, and 10*rc*. That is, the relay apparatus 30 transfers the content data transmitted by one communication terminal 10 to another communication terminal 10 having the same conference ID.

Further, in steps S50 to S54, the session managing unit 55 of the transmission management apparatus 50 counts the number of communication terminals 10 having the same conference ID and transmits the number to the communication terminals 10*t*, 10*rb*, and 10*rc*. For example, in the session management DB 5004, the number of participants is counted as “3” because the same conference ID is associated with three communication terminals 10*t*, 10*rb*, and 10*rc*. Accordingly, the number of participants 3 is transmitted to the communication terminals 10*t*, 10*rb*, and 10*rc*. The number of participants includes their own sites. Alternatively, a number of participants 2, that does not include their own sites, may be transmitted.

Further, each communication terminal 10 may specify the session ID and acquire the information of the session management DB 5004, and the communication terminal 10 may count the number of participants.

Further, rather than having the transmission management apparatus 50 directly transmit the number of participants, the types of contents to be received by each communication terminal 10 may be counted. That is, when the relay apparatus 30 transmits the content to the communication terminal 10 that is the transmission destination, the ID of the communication terminal 10 that is the transmission source (either the communication ID or an ID separately assigned) is appended, so that the number of participants can be counted from the types of IDs.

<Switching Between Screen Sharing and Still Image Sharing According to the First Embodiment>

Figure 10:
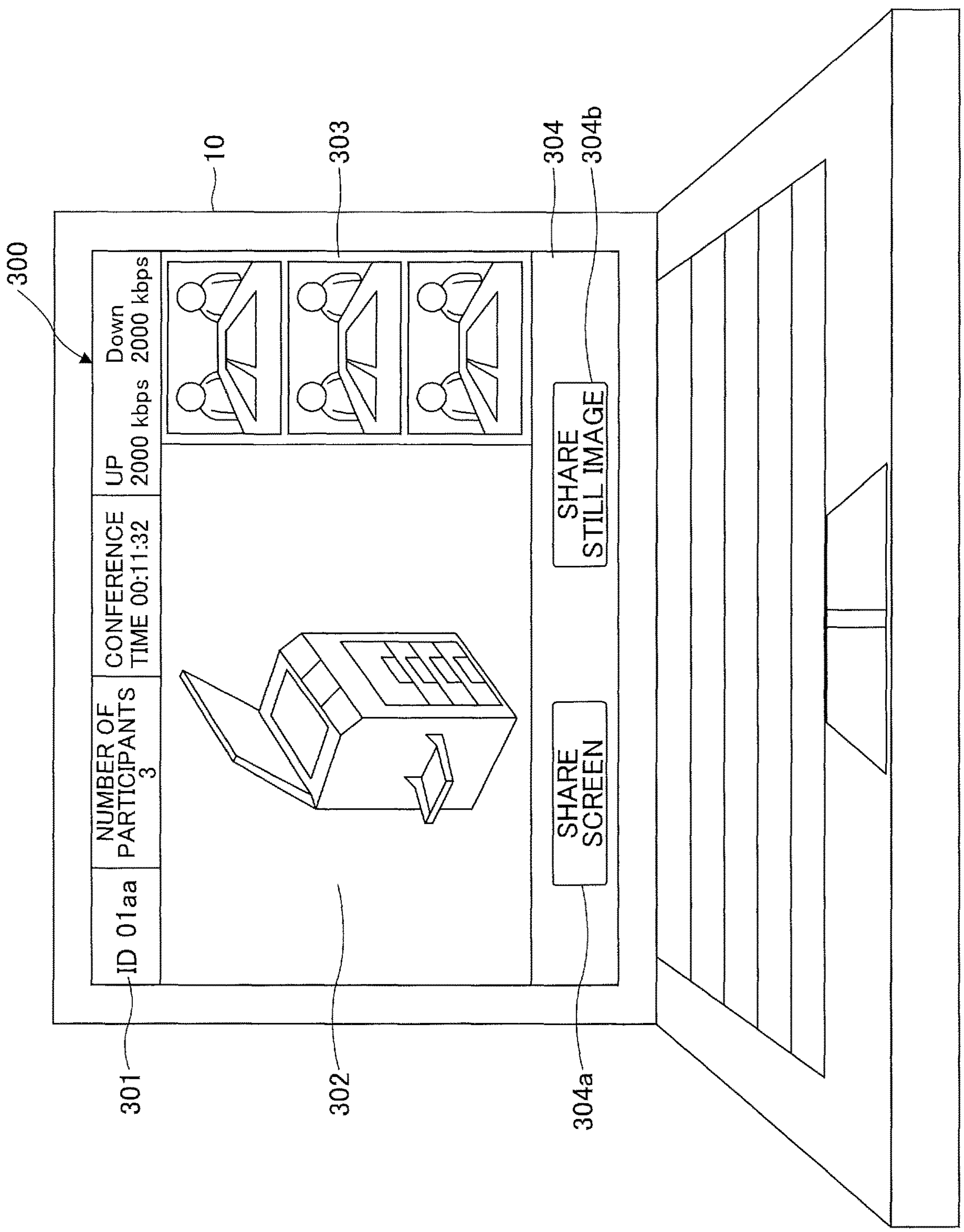
FIG. 10 is a diagram illustrating an example of an in-communication screen displayed by a communication terminal according to the first embodiment of the present invention.

FIG. 10 illustrates an example of an in-communication screen 300 displayed by the communication terminal 10*t*. The in-communication screen 300 mainly includes a state display field 301, a shared information display field 302, an image display field 303, and a button field 304. The communication ID of the own terminal, the number of participants, the conference time, and the network band information are displayed in the state display field 301. A user of the communication terminal 10 who wishes to participate in the same video conference as the communication terminal 10 based on the communication ID of his/her own site, can participate in the same video conference by querying the terminal ID and inputting or selecting the terminal ID in the communication terminal 10 which he/she is operating. The number of participants is the number of communication terminals 10 participating in the same conference. The number of participants is also referred to as the number of sites. The conference time is the elapsed time from when the session has been established. Network band information is the upstream (UP) communication speed and the downstream (DOWN) communication speed of the content.

A screen sharing button 304*a* and a still image sharing button 304*b* are displayed in the button field 304. The screen sharing button 304*a* is a button for starting screen sharing, and the still image sharing button 304*b* is a button for starting the still image sharing. When the user presses the screen sharing button 304*a*, a file selection screen is displayed, allowing the user to select a file in the recording medium 706 or the network. When the user presses the still image sharing button 304*b*, the share processing unit 23 captures the screen displayed in the shared information display field 302 when the button is pressed. This still image is displayed in the shared information display field 302. Each communication terminal 10 displays the screen sharing button 304*a* and the still image sharing button 304*b*, and, therefore, the screen or the still image of the communication terminal 10 for which the screen sharing button 304*a* or the still image sharing button 304*b* is pressed last, is shared.

In the shared information display field 302, at the time of screen sharing, an image of the screen, in which any file or the like selected by the user is displayed, is displayed, and at the time of still image sharing, a still image of the file or the like is displayed. At the time of screen sharing, the image of the screen displayed in the shared information display field 302 is repeatedly transmitted to the relay apparatus 30 (for example, at a period of a refresh rate). In order to reduce the delay time, the communication terminal 10 transmits an image of the screen at a resolution lower than the resolution of the screen or an image obtained by compressing the image of the screen.

The file may be, for example, a file of a drawing used in CAD, a file for a presentation that the user wishes to share at the conference, a file of a document of a reference material, etc., as long as the file can be displayed on the screen. The screen of the application software operated by the communication terminal 10 may be shared. For example, a screen displayed by a web browser can be shared. FIG. 10 illustrates the case in which the communication terminal 10 is a general-purpose terminal. However, in the case of an exclusive-use terminal, an image of the PC connected to the communication terminal 10 can be shared.

The shared image is not limited to the image of the screen displayed on the screen of the communication terminal 10*t* on the transmitting side; a file saved by the communication terminal 10*t* on the transmitting side or a file on the network may be shared.

The still image is a screen shot obtained by importing the screen at the time of screen sharing by the share processing unit 23. The resolution of the still image is at least the resolution of the shared information display field 302, and, therefore, the still image has a resolution that is higher than the resolution at the time of screen sharing. Alternatively, the original file may be loaded into the RAM 703 and the still image may be imported from the RAM 703 without being displayed on the display. In this case, the still image can be generated at the resolution of the original file.

In the image display field 303, an image captured by the camera of each communication terminal 10 is displayed. FIG. 10 illustrates an example in which the three communication terminals 10 are holding a conference, and three images are displayed in the image display field 303. One of these images is an image of the own site.

<Still Image Data Sharing Procedure According to the First Embodiment>

Figure 11:
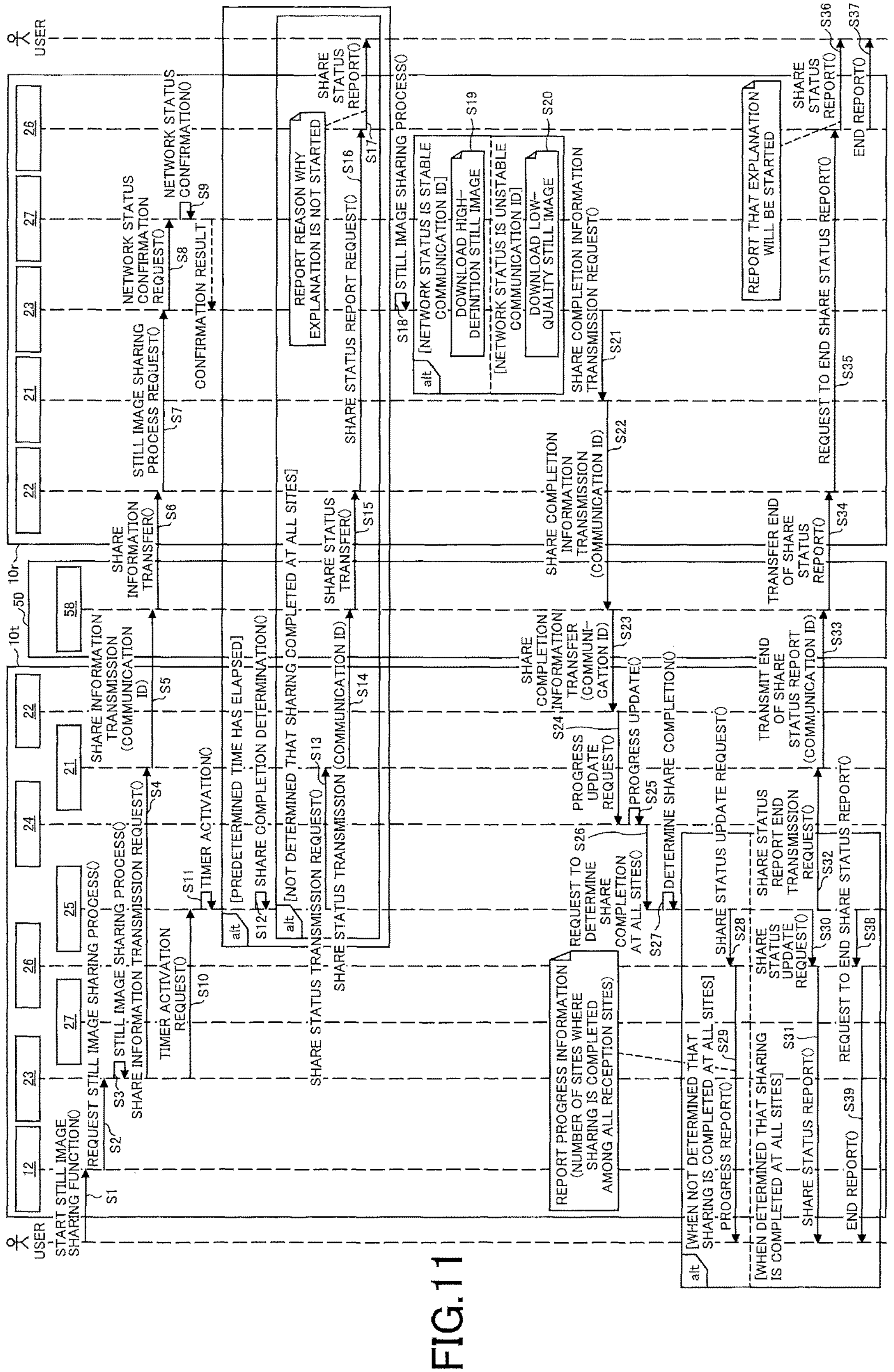
FIG. 11 is an example of a sequence diagram explaining a procedure for sharing still image data between a communication terminal on the transmitting side and a communication terminal on the receiving side according to the first embodiment of the present invention.

FIG. 11 is an example of a sequence diagram explaining a procedure in which the communication terminal 10 on the transmitting side and the communication terminal 10 in the receiving side share still image data. In the description of FIG. 11, it is assumed that screen sharing is already being performed. Further, only one communication terminal 10*r* on the receiving side is illustrated.

S1: A user of the communication terminal 10*t* on the transmitting side starts still image sharing (by pressing the still image sharing button 304*b*).

S2: The operation input accepting unit 12 accepts the start of still image sharing and requests a process of creating a still image to the share processing unit 23.

S3: The share processing unit 23 creates two still images; one is a high-definition still image and the other is a low-quality still image. Only the high-definition still image may be transmitted to the relay apparatus 30, and the relay apparatus 30 may generate a low-quality still image from the high-definition still image.

S4: The share processing unit 23 transmits two still images to the message transmitting unit 21.

S5: The message transmitting unit 21 transmits two still images to the relay apparatus 30 together with the own communication ID. This process is omitted in FIG. 11. The relay apparatus 30 holds the still images in association with the communication ID. The message transmitting unit 21 transmits share information for requesting still image sharing, together with the own communication ID, to the transmission management apparatus 50. The message transferring unit 58 records the communication ID of the communication terminal 10*t* on the transmitting side that has transmitted the still images.

S6: The transmitting/receiving unit 51 of the transmission management apparatus 50 receives the share information, and the message transferring unit 58 identifies the communication terminals 10*rb* and 10*rc* participating in the same conference based on the information in the session management DB 5004 and the communication ID transmitted from the communication terminal 10*t*, and transmits the share information requesting the still image sharing to the communication terminals 10*rb* and 10*ra*.

S7: The message receiving unit 22 of the communication terminal 10*r* on the receiving side receives the share information and requests the share processing unit 23 to share the still image.

S8: The share processing unit 23 confirms the network status with the network status confirming unit 27 in order to determine whether to receive the high-definition still image or the low-quality still image.

S9: The network status confirming unit 27 confirms the present network status. The confirmation result is returned to the share processing unit 23. The confirmation result may be, for example, a result of the comparison of the network band and a threshold, and indicates stable or unstable. When the network band has a bandwidth that is below or less than or equal to the threshold, the network status is unstable, and otherwise the network status is stable.

S10: On the other hand, the communication terminal 10*t* on the transmitting side requests the share completion determining unit 25 to activate a timer after the upload to the relay apparatus 30 is completed. This is requested to determine whether the share completion report has been received from all of the communication terminals 10*r* within a predetermined time period. The starting point of the predetermined time period may be when the still image sharing button 304*b* is pressed, when the uploading is completed, or when the uploading is started.

S11: The share completion determining unit 25 activates the timer and measures the predetermined time period. The predetermined time period may be, for example, from a few seconds to several tens of seconds, but may be set as appropriate. The value of the predetermined time period may be set by the user of each communication terminal 10. Further, the predetermined time period may not necessarily be fixed, for example, the predetermined time period may be longer as the number of participants increases.

Steps S12 to S17 are executed after the predetermined time period elapses.

S12: The share completion determining unit 25 determines whether the predetermined time period has elapsed.

S13: When the predetermined time period has elapsed but the share completion report is not received from all of the communication terminals 10*r* on the receiving side, the share completion determining unit 25 requests the message transmitting unit 21 to report the share status that the sharing is not completed by all of the communication terminals 10*r* on the receiving side.

S14: The message transmitting unit 21 specifies the own communication ID and transmits the share status to the transmission management apparatus 50. It may be specified whether to transmit the share status to all of the communication terminals 10*r* on the receiving side or to transmit the share status only to the communication terminals 10*r* on the receiving side that have transmitted the share completion report. The communication terminal 10*r* on the receiving side that has transmitted the share completion report is managed by progress management information illustrated in FIG. 12.

S15: The transmitting/receiving unit 51 of the transmission management apparatus 50 receives the share status, and the message transferring unit 58 transmits the share status to the communication terminal 10*r* on the receiving side. The transmission management apparatus 50 may control whether to transmit the share status to all of the communication terminals 10*r* on the receiving side or to transmit the share status only to the communication terminal 10*r* on the receiving side that has transmitted the share completion report. When transmitting the share status to all of the communication terminals 10*r* on the receiving side, the message may be changed between the message to be transmitted to the communication terminal 10*r* on the receiving side that has transmitted the share completion report and the message to be transmitted to the communication terminal 10*r* that has not transmitted the share completion report.

S16: The message receiving unit 22 of the communication terminal 10*r* on the receiving side receives the share status and transmits the share status to the share status reporting unit 26.

S17: The share status reporting unit 26 receives a request to report the share status and reports the share status to the user. For example, when a share completion report has been transmitted, a message such as "Sharing is not completed at all sites. Please wait for a while." is displayed or a voice sound guidance is output. An alarm may be sounded. When the share completion report has not been transmitted, a message such as "Sharing is not completed at this site. Please wait for a while" is displayed or a voice sound guidance is output. An alarm may be sounded.

S18: On the other hand, the share processing unit 23, which has received the confirmation result of the network status from the network status confirming unit 27, downloads the still image from the relay apparatus 30 in accordance with the result.

S19: When the network is stable, the share processing unit 23 specifies the own communication ID and downloads the still image data of the high-definition still image from the relay apparatus 30. The relay apparatus 30 identifies the communication ID participating in the same conference based on the communication ID, and, therefore, the held still image can be transmitted to the communication terminal 10*r* on the receiving side participating in the same conference.

S20: When the network is unstable, the share processing unit 23 specifies the own communication ID and downloads the still image data of the low-quality still image from the relay apparatus 30.

S21: After the sharing (download) of the still image data is completed, the share processing unit 23 requests the message transmitting unit 21 to transmit a share completion report.

S22: The message transmitting unit 21 specifies the own communication ID and transmits the share completion report to the transmission management apparatus 50. It is also desirable to report whether a high-definition still image or a low-quality still image has been downloaded. The communication terminal 10*t* on the transmitting side displays whether a high-definition still image or a low-quality still image has been downloaded for each communication terminal 10*r*, and, therefore, the transmitter can give consideration to the user who has received the low-quality still image.

S23: The transmitting/receiving unit 51 of the transmission management apparatus 50 receives the share completion report, and the message transferring unit 58 transmits the share completion report together with the communication ID on the receiving side, to the communication terminal 10*t* on the transmitting side recorded in step S5.

S24: The message receiving unit 22 of the communication terminal 10*t* on the transmitting side receives the share completion report and requests the progress managing unit 24 to update the progress.

S25: The progress managing unit 24 updates the progress of the still image sharing in response to the request. For example, as illustrated in FIG. 12, the progress managing unit 24 records the communication ID of the communication terminal 10*r* on the receiving side that has transmitted the share completion report. FIG. 12 is an example of the progress management information recorded by the progress managing unit 24. At the start of still image sharing, the progress managing unit 24 registers the communication IDs of the communication terminals 10 participating in the same conference in the progress management information. Then, the fact that the share completion report has been transmitted is recorded in association with the communication ID of the communication terminal 10*r* on the receiving side that has transmitted the share completion report. The communication IDs of the communication terminals 10 participating in the same conference are acquired from the session management DB 5004.

The progress management may be performed by the transmission management apparatus 50 rather than by the communication terminal 10*t*. Similarly, the communication terminals 10 participating in the same conference may be identified in the session management DB 5004 to create the progress management information as illustrated in FIG. 12.

S26: The progress managing unit 24 requests the share completion determining unit 25 to determine whether the sharing is completed at all sites after the progress is updated.

S27: The share completion determining unit 25 compares the "number of participants-1 (1 represents the own base)" of the conference with the progress of the sharing (the number of the communication terminals 10 that have transmitted the share completion report) to determine whether the sharing is completed.

S28: When it is not determined that the sharing is completed at all of the sites, the share completion determining unit 25 requests the share status reporting unit 26 to report the share status.

S29: The share status reporting unit 26 reports, to the user, the progress of how many terminals out of the terminals at all of the sites on the receiving side have completed sharing based on the progress management information. The report may be made by displaying a message or outputting a voice sound guidance. In the process illustrated in FIG. 11, the progress is not displayed unless one or more communication terminals 10*r* on the receiving side have transmitted the share completion report to the communication terminal 10*t* on the transmitting side. However, the communication terminal 10*t* on the transmitting side can display the progress if it is after the start of still image sharing.

S30: When it is determined that the sharing is completed at all of the sites, the share completion determining unit 25 requests the share status reporting unit 26 to report the share status.

S31: The share status reporting unit 26 reports, to the user, a message such as "Sharing is completed at all sites" reporting that all of the sites on the receiving side have completed the sharing. The report may be made by displaying a message or outputting a voice sound guidance.

S32: The share completion determining unit 25 requests the message transmitting unit 21 to transmit a share status report termination request in order to terminate the share status reporting because all of the sites on the receiving side have completed the sharing.

S33: The message transmitting unit 21 specifies the communication ID of the own site and transmits a share status report termination request to the transmission management apparatus 50.

S34: The transmitting/receiving unit 51 of the transmission management apparatus 50 receives the share status report termination request, and the message transferring unit 58 identifies the communication terminals 10*rb* and 10*rc* participating in the same conference based on the information of the session management DB 5004 and the communication ID transmitted from the transmitting side, and transmits the share status report termination request to each of the communication terminals 10*rb* and 10*rc*.

S35: The message receiving unit 22 of the communication terminal 10*r* on the receiving side receives the share status report termination request and transmits the share status report termination request to the share status reporting unit 26.

S36: The share status reporting unit 26 reports, to the user, a message such as "Sharing is completed at all sites, so explanation will start." to start the explanation. The report may be made by a message display, a voice sound guidance output, or an alarm tone.

S37: When a message is displayed, the share status reporting unit 26 erases the message indicating that the explanation will start.

S38: The share completion determining unit 25 of the communication terminal 10*t* on the transmitting side transmits the share status report termination request to the share status reporting unit 26.

S39: The share status reporting unit 26 erases the message indicating the progress that all of the sites on the receiving side have completed sharing, which has been displayed in step S31.

As described above, when there is a communication terminal 10*r* that has not been able to complete the reception within the predetermined time period, the communication terminal 10*r* on the receiving side that has completed reception can report the share status to the user. The communication terminal 10*t* on the transmitting side can recognize the number of communication terminals 10*r* that have completed the sharing.

<<Process by communication terminal on transmitting side according to the first embodiment>>

Figure 13:
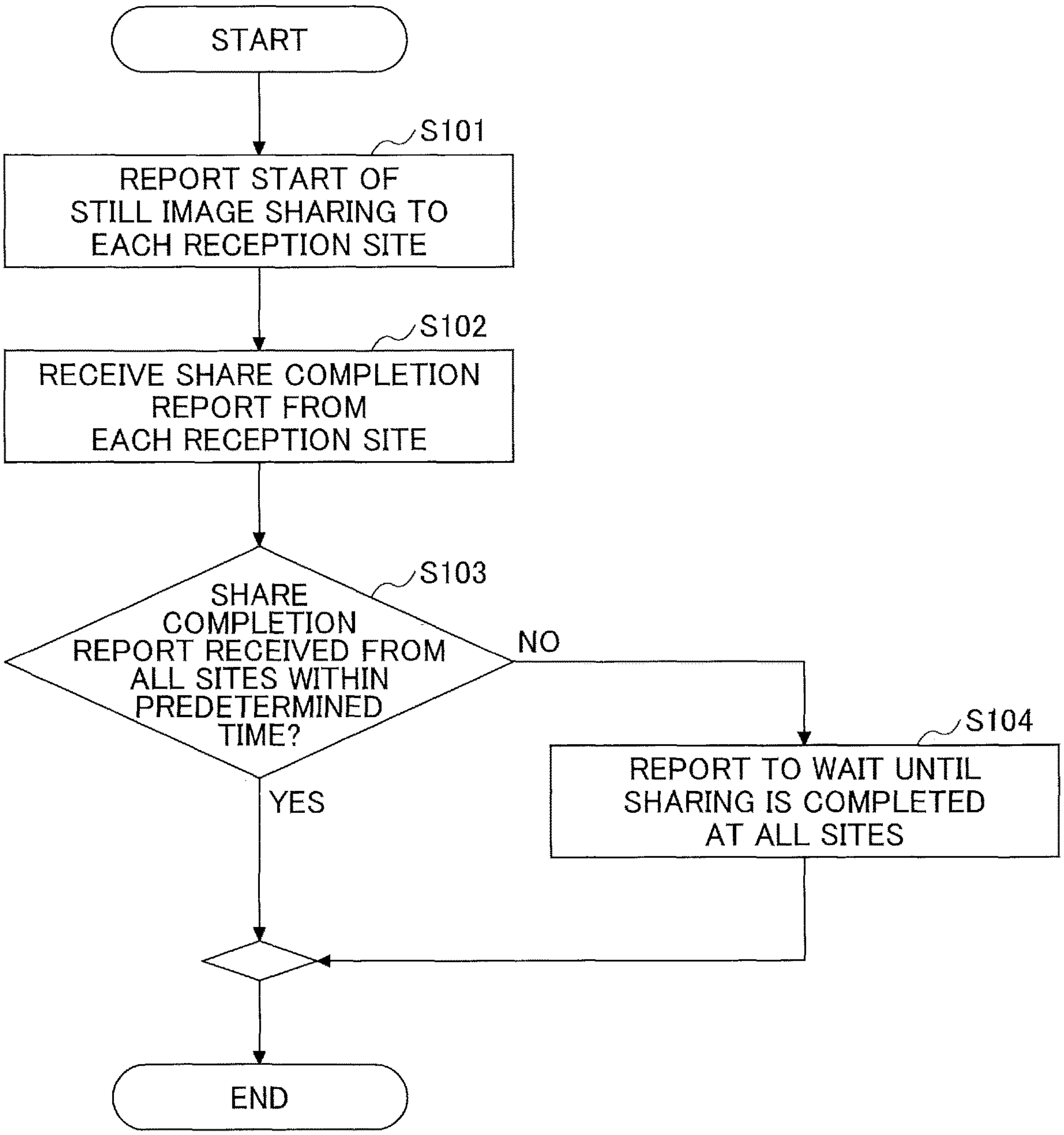
FIG. 13 is an example of a flowchart illustrating a process performed by a communication terminal on the transmitting side according to the first embodiment of the present invention.

FIG. 13 is an example of a flowchart illustrating a process performed by the communication terminal 10*t* on the transmitting side.

The message transmitting unit 21 of the communication terminal 10*t* on the transmitting side transmits a report of the start of still image sharing to the communication terminal 10*r* on the receiving side (step S101).

The share completion determining unit 25 of the communication terminal 10*t* on the transmitting side receives a share completion report from the communication terminal 10*r* on the receiving side (step S102).

The share completion determining unit 25 determines whether the share completion report has been received from all of the sites on the receiving side within a predetermined time period (step S103), and when the share completion report has not been received from all of the sites on the receiving side, the share completion determining unit 25 transmits the share status (the reason for not starting the explanation) to the communication terminal 10*r* on the receiving side (step S104).

<<Process by Communication Terminal on Receiving Side According to the First Embodiment>>

Figure 14:
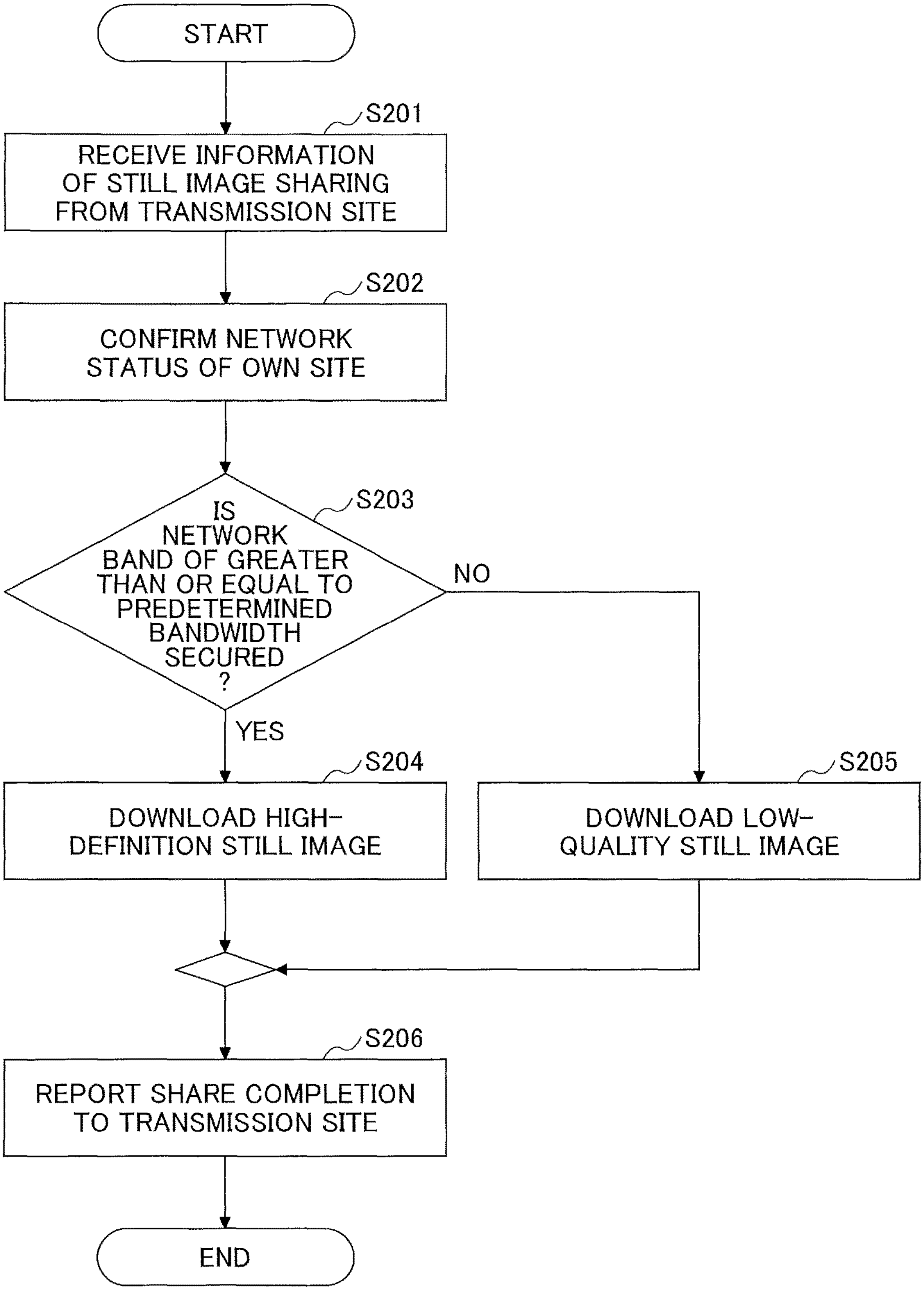
FIG. 14 is an example of a flowchart illustrating a process performed by a communication terminal on the receiving side according to the first embodiment of the present invention.

FIG. 14 is an example of a flowchart illustrating a process performed by the communication terminal 10*r* on the receiving side.

The share processing unit 23 of the communication terminal 10*r* on the receiving side receives a report of the start of still image sharing from the communication terminal 10*t* on the transmitting side (step S201).

Thus, the network status confirming unit 27 confirms the network status of the own site (step S202).

When a network band that is greater than or equal to a predetermined bandwidth is secured (YES in step S203), that is, when the network band is stable, the share processing unit 23 downloads a high-definition still image from the relay apparatus 30 (step S204).

When a network band that is greater than or equal to a predetermined bandwidth is not secured (NO in step S203), that is, when the network band is unstable, the share processing unit 23 downloads a low-quality still image from the relay apparatus 30 (step S205).

When the downloading is completed, the share processing unit 23 transmits a share completion report to the communication terminal 10*t* on the transmitting side (step S206).

<Example of Transition of Information to be Reported According to the First Embodiment>

Figure 15:
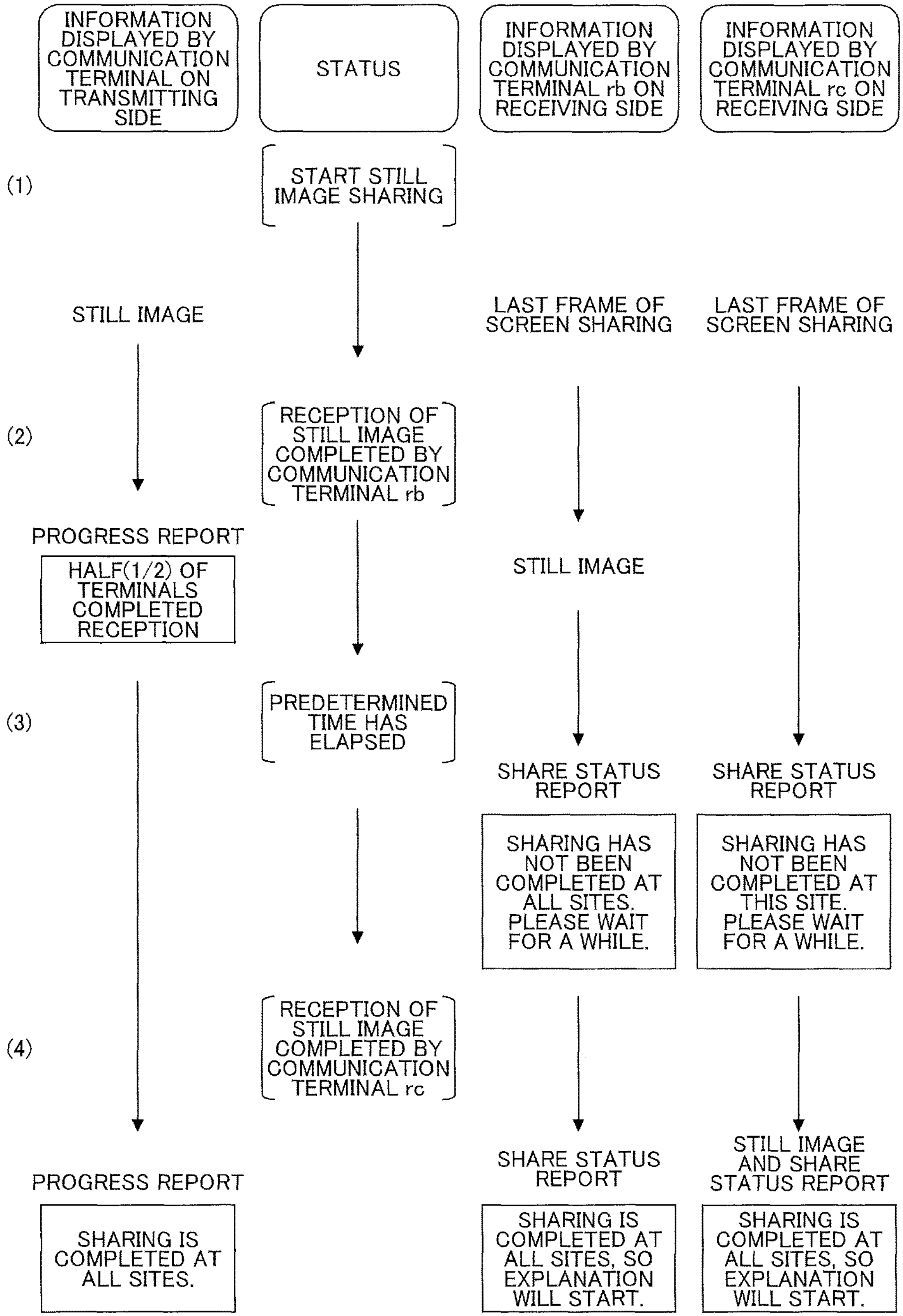
FIG. 15 is a diagram illustrating a transition example of the report to the user displayed by the communication terminal on the transmitting side and the communication terminal on the receiving side according to the first embodiment of the present invention.

FIG. 15 is a diagram illustrating a transition example of the report to the user displayed by the communication terminal 10*t* on the transmitting side and the communication terminal 10*r* on the receiving side. The following explanation is given in accordance with (1) to (4).

(1) The user of the communication terminal 10*t* on the transmitting side starts still image sharing.

Accordingly, the communication terminal 10*t* on the transmitting side displays a high-definition still image. The communication terminal 10*r* on the receiving side no longer receives the image of the screen that was being shared with the communication terminal 10*t* on the transmitting side, so the last frame of the screen sharing is displayed, or may not display anything.

(2) The communication terminal 10*rb* on the receiving side completes the still image sharing. Accordingly, the communication terminal 10*rb* on the receiving side displays a still image. A high-resolution still image or a low-quality still image may be displayed. The communication terminal 10*t* on the transmitting side reports, for example, "half (½) of terminals have completed reception" as the progress. The numerator is the number of communication terminals 10 which have completed sharing, and the denominator is the number of all of the communication terminals 10*r* on the receiving side. As described above, the number of the communication terminals 10*r* that have transmitted a share completion report can be displayed. The number of communication terminals 10*r* that have not transmitted a share completion report may be displayed.

(3) The predetermined time period has elapsed from the start of still image sharing. Accordingly, the communication terminal 10*rb* on the receiving side displays a message such as "Sharing has not been completed at all sites. Please wait for a while." as the share status. The communication terminal 10*rc* on the receiving side displays a message such as "Sharing has not been completed at this site. Please wait for a while." as the share status. Accordingly, the user of the communication terminal 10*rb* on the receiving side can recognize the reason why the explanation does not start even though the still image is received. The user of the communication terminal 10*rc* on the receiving side can recognize that the own site has not completed sharing.

(4) The communication terminal 10*c* completes the still image sharing.

Accordingly, the communication terminal 10*t* on the transmitting side displays a message such as "Sharing is completed at all sites." as the progress. The communication terminal 10*rb* on the receiving side displays a message such as "Sharing is completed at all sites, so explanation will start." and the share status. The communication terminal 10*rb* on the receiving side displays a still image, and displays a message such as "Sharing is completed at all sites, so explanation will start." as the share status.

<Main Effects According to the First Embodiment>

As described above, in the communication system according to the present embodiment, when all of the communication terminals 10*r* on the receiving side have not transmitted a share completion report to the communication terminal 10*t* on the transmitting side, the communication terminal 10*r* on the receiving side receives and displays a share status report reporting that it is taking time for the reception. Therefore, the user on the receiving side recognizes the reason why the explanation is not started, and is thus less prone to feel worried or stressed.

Second Embodiment

In the second embodiment, a configuration in which the communication terminal 10 performs remote communication using a web browser will be described.

Figure 16:
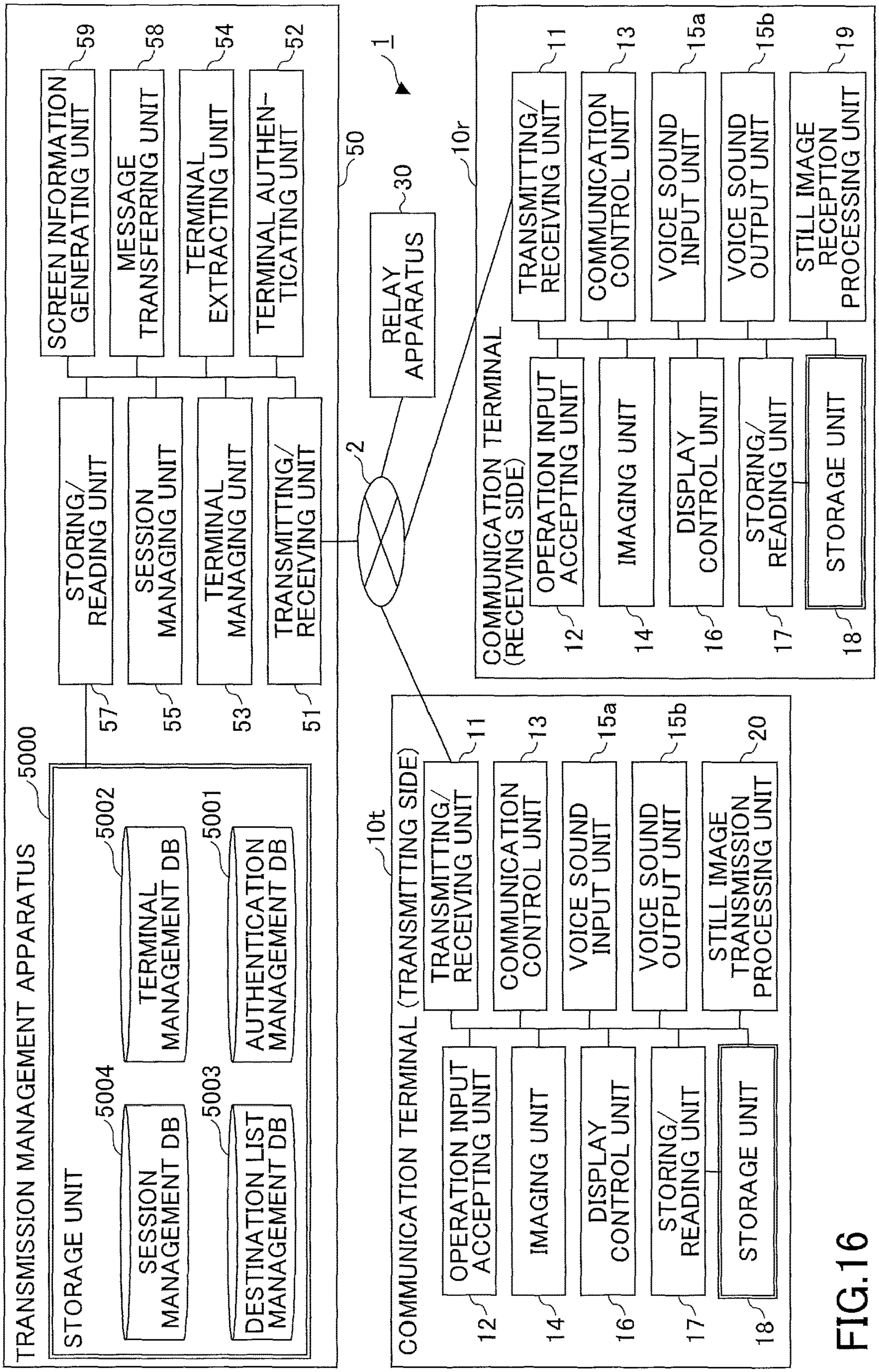
FIG. 16 is a functional block diagram illustrating functions of a transmission management apparatus, a communication terminal on the transmitting side, and a communication terminal on the receiving side included in a communication terminal illustrated as block shapes according to a second embodiment of the present invention.

FIG. 16 is a functional block diagram illustrating functions of the transmission management apparatus 50, the communication terminal 10*t* on the transmitting side, and the communication terminal 10*r* on the receiving side that are included in the communication system 1, illustrated as block shapes. In the description of FIG. 16, the difference from FIG. 6 will be mainly explained.

<<Functional Configuration of Transmission Management Apparatus According to the Second Embodiment>>

The transmission management apparatus 50 according to the present embodiment includes a screen information generating unit 59 in addition to the functions of the first embodiment. The screen information generating unit 59 generates screen information of a web page displayed by the communication terminal 10 that is a web server by using a web browser. The screen information is described by Hyper Text Markup Language 5 (HTMLS), eXtensible Markup Language (XML), JavaScript (registered trademark), and Cascade Style Sheet (CSS). A web page may simply be referred to as a screen. The web page is provided by a web application executed by the communication terminal 10. A web application refers to software or mechanisms executed on a browser, by the cooperation of programs in a programming language (e.g., JavaScript) running on a web browser with programs running on a web server. A web page can be changed dynamically by a web application.

The communication terminal 10 and the transmission management apparatus 50 can execute a web application (service) provided by the transmission management apparatus 50 by transmitting and receiving data using a communication protocol such as HyperText Transport Protocol (HTTP), Hypertext Transfer Protocol Secure (HTTPS), etc., or an Application Interface (API) such as Web Real Time Communication (WebRTC). Screen information includes content.

The functions of the communication terminal (the transmitting/receiving unit 11, the operation input accepting unit 12, the communication control unit 13, the imaging unit 14, the voice sound input unit 15*a*, the voice sound output unit 15*b*, the display control unit 16, the storing/reading unit 17, and the still image transmission processing unit 20) are implemented by the web browser executing JavaScript (registered trademark). The web browser can access the resources (the camera, the speaker, the microphone) of the communication terminal 10.

<<Communication Via Web Browser According to the Second Embodiment>>

Figure 17:
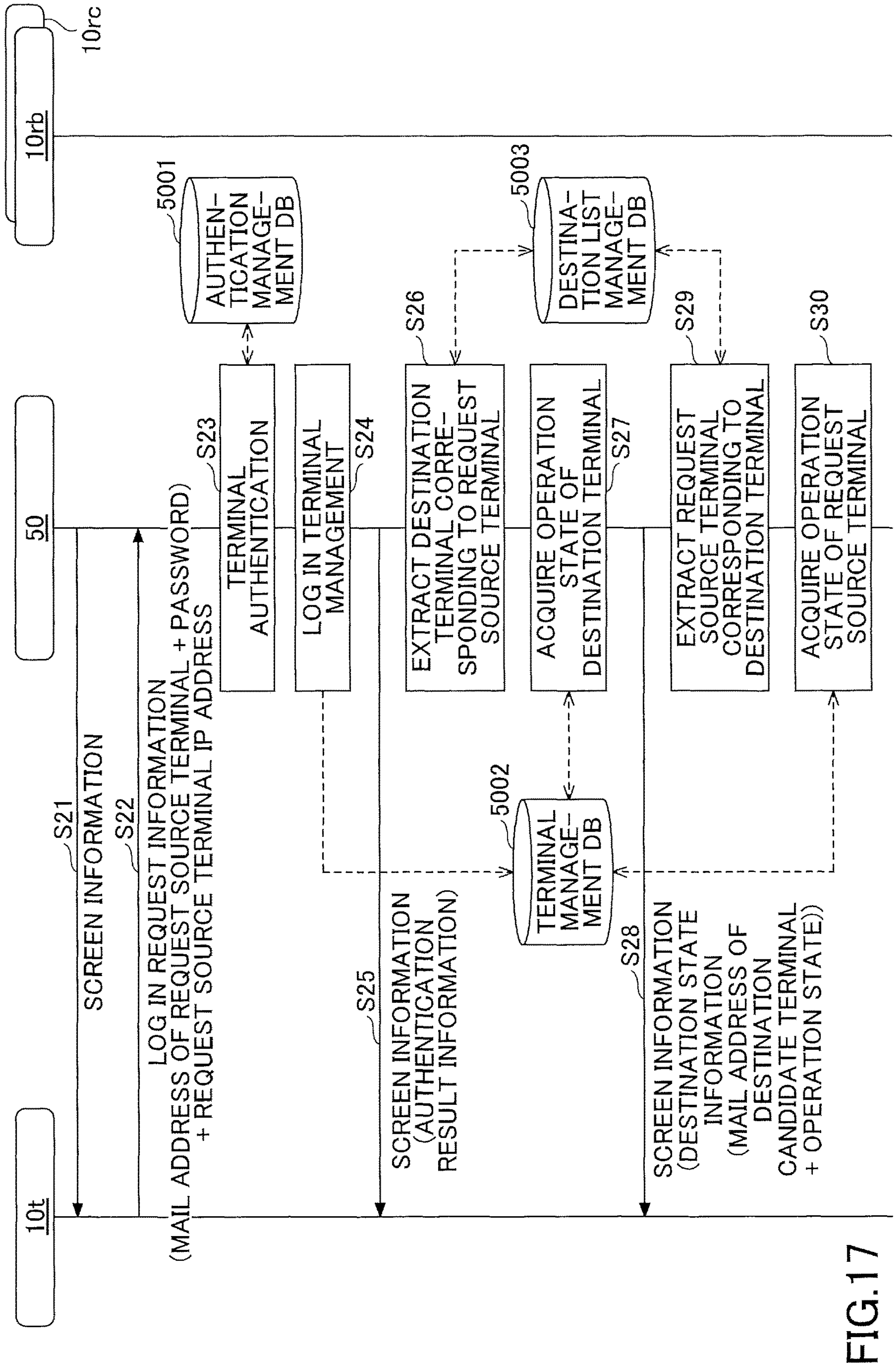
FIG. 17 is a sequence diagram illustrating an example of a process in the preparation stage of communication of a communication system according to the second embodiment of the present invention.

FIG. 17 is a sequence diagram illustrating an example of a process in the preparation stage of communication of the communication system 1. The overall flow of the process of FIG. 17 is the same as that of FIG. 8, and differs in that the communication ID is the mail address and the information that is transmitted and received between the transmission management apparatus 50 and the communication terminal 10 is the screen information of the web page. For this reason, the difference from FIG. 8 will be mainly explained.

S21: The web browser operates on the communication terminal 10, and, therefore, the communication terminal 10*t* acquires the screen information of a log in screen described by HTML, XML, JavaScript (registered trademark), CSS, and the like, from the transmission management apparatus 50. Hereinafter, in step S25 and step S28, screen information displayed by the web browser is transmitted.

Further, in step S22 and step S28, as the communication ID transmitted to the transmission management apparatus 50 by the communication terminal 10*t*, the identification information of a user that guarantees uniqueness, such as a mail address, is transmitted.

Figure 18:
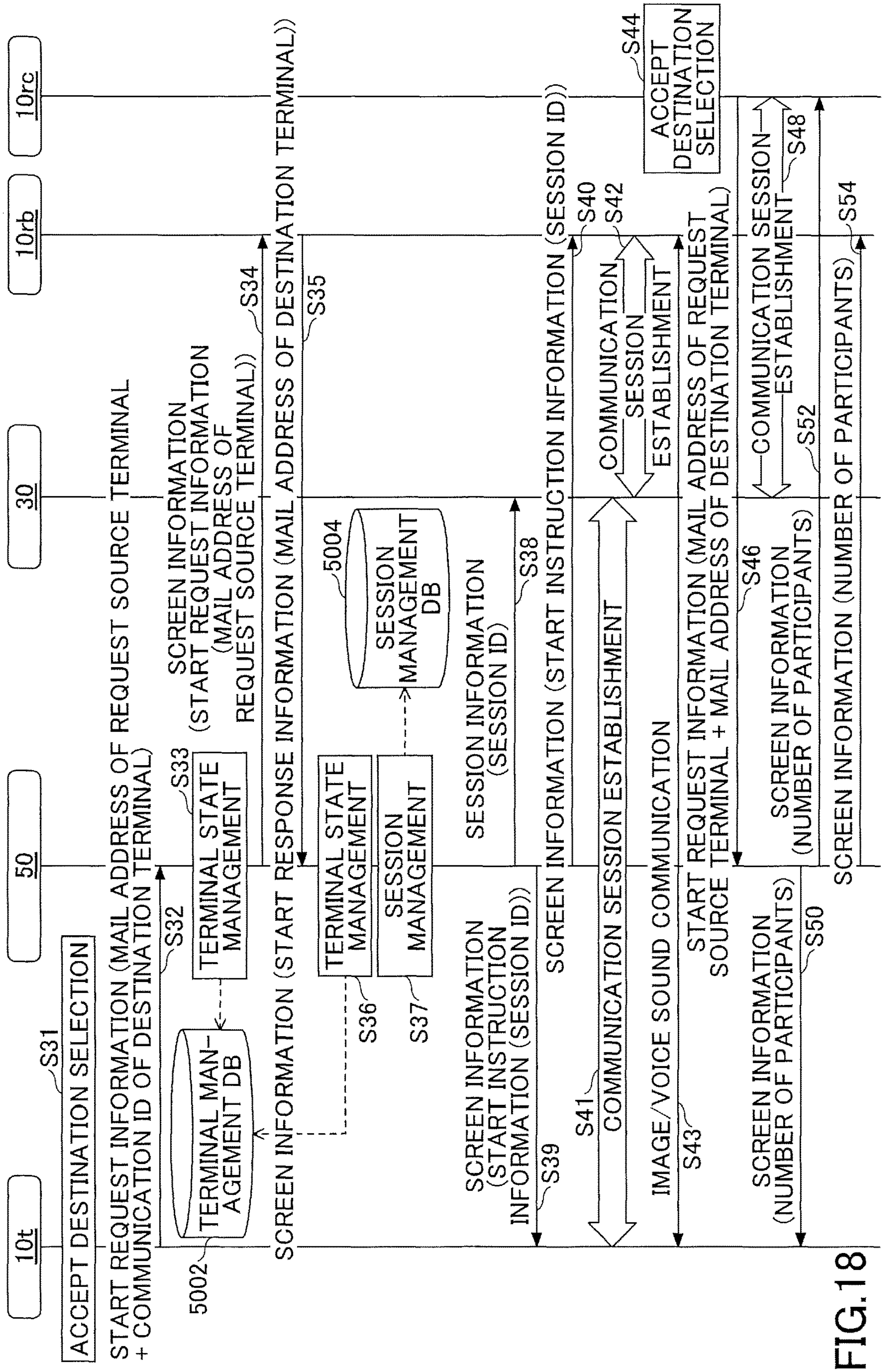
FIG. 18 is a sequence diagram illustrating an example of a communication process of a communication system according to the second embodiment of the present invention.

FIG. 18 is a sequence diagram illustrating an example of a communication process of the communication system 1. The overall flow of the process of FIG. 18 is the same as that of FIG. 9, and differs in that the communication ID is a mail address and the information that is transmitted and received between the transmission management apparatus 50 and the communication terminal 10 is the screen information of the web page. For this reason, the difference from FIG. 9 will be mainly explained.

In steps S34, S39, S40, S43, S50, S52, and S54, screen information to be displayed by the web browser is transmitted. Further, in steps S32, S34, S35, S38, S39, S40, and S46, etc., as the communication ID transmitted to the transmission management apparatus 50 by the communication terminal 10*t*, the identification information of a user that guarantees uniqueness, such as a mail address, is transmitted.

Figure 19:
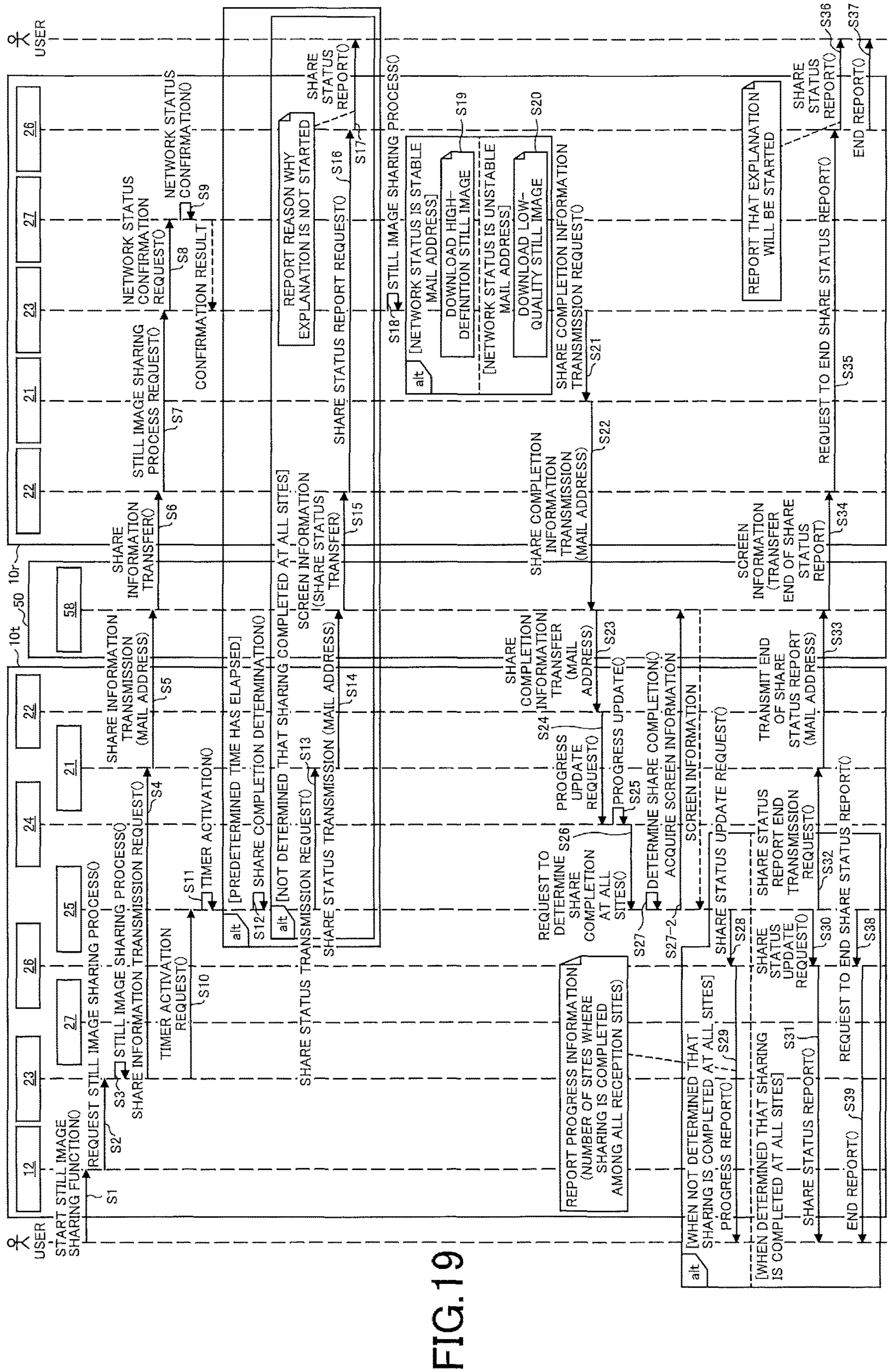
FIG. 19 is an example of a sequence diagram illustrating a procedure for sharing still image data between a communication terminal on the transmitting side and a communication terminal on the receiving side according to the second embodiment of the present invention.

FIG. 19 is an example of a sequence diagram explaining a procedure in which the communication terminal 10 on the transmitting side and the communication terminal 10 in the receiving side share the still image data. The overall flow of the process of FIG. 19 is the same as that of FIG. 11, and differs in that the communication ID is the mail address and the information that is transmitted and received between the transmission management apparatus 50 and the communication terminal 10 is the screen information of the web page. For this reason, the difference from FIG. 11 will be mainly explained.

In steps S17, S29, S31, and S36, screen information to be displayed by the web browser is transmitted. In step S27-2, the share completion determining unit 25 acquires, from the transmission management apparatus 50, the screen information corresponding to the determination result. Further, in steps S5, S14, S22, S23, and step S33, etc., as the communication ID transmitted to the transmission management apparatus 50 by the communication terminal 10*t*, the identification information of a user that guarantees uniqueness, such as a mail address, is transmitted.

<Overview of Second Embodiment>

Thus, according to the second embodiment, the same process as in the first embodiment can be implemented by executing the web application by the web browser.

The second embodiment has been described by incorporating the processes of the first embodiment; however, processes necessary for the execution of a web application may be added, or processes may be omitted.

[Other Applications]

While the preferred embodiments of the present invention have been described with reference to examples, the present invention is not limited to such embodiments, and various modifications and substitutions may be made thereto without departing from the spirit and scope of the invention.

For example, in the present embodiment, the relay apparatus 30 relays the content data, but the relay apparatus 30 may not be present. An example of a communication protocol that enables this type of configuration is Web Real-Time Communication (WebRTC). WebRTC is a communication protocol that enables the exchange of image data, voice sound data, etc., between browsers.

In the above-described embodiment, as an example of the content data, image data, voice sound data, the document material data, and handwritten information have been described. However, the present invention is not limited thereto, and the content data may be tactile data. In this case, the sense felt by a user by contact at one communication terminal is transmitted to another communication terminal. Further, the content data may be smell data.

The transmission management apparatus 50 also includes a plurality of computing devices, such as a server cluster. The plurality of computing devices are configured to communicate with each other via any type of communication link, including a network, a shared memory, and the like, and perform the processes disclosed herein. Similarly, the communication terminal 10 may include a plurality of computing devices configured to communicate with each other.

Furthermore, the configuration example of FIGS. 6, 7, etc., indicated in the above embodiment is divided according to the main functions to facilitate the understanding of processes by the communication terminal 10 and the transmission management apparatus 50. The present invention is not limited by how the process units are divided or the names of the process units. The processes of the communication terminal 10 and the transmission management apparatus 50 may be further divided into many process units according to the process contents. Furthermore, the process units may be divided such that a single process unit further includes many processes.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), a System on a chip (SOC), a Graphics Processing Unit (GPU), and a conventional circuit module, designed to execute each function as described above.

According to one embodiment of the present invention, a communication system in which communication terminals on the receiving side can share the reception status of the shared data, can be provided.

The communication system, the data sharing method, and the recording medium are not limited to the specific embodiments described in the detailed description, and variations and modifications may be made without departing from the spirit and scope of the present invention.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

What is claimed is:

1. A communication system comprising:

a first communication terminal; and a plurality of second communication terminals, wherein the first communication terminal and the plurality of second communication terminals are configured to share shared data with each other, wherein the first communication terminal includes:

a first processor; and a first memory storing program instructions that cause the first processor to transmit the shared data to the plurality of second communication terminals;

receive a sharing completion report, indicating that sharing of the shared data has been completed, from at least one second communication terminal of the plurality of second communication terminals at which sharing of the shared data is completed;

transmit a sharing incomplete status report and a first message to the at least one second communication terminal from which the sharing completion report has been received, (i) the sharing incomplete status report indicating the presence of another second communication terminal from among the plurality of second communication terminals that has not yet transmitted the sharing completion report, and (ii) the first message providing an alert that the another second communication terminal that has not transmitted the sharing completion report is present among the plurality of second communication terminals, and each of the plurality of second communication terminals includes:

a second processor; and a second memory storing program instructions that cause the second processor to receive the shared data from the first communication terminal;

display the first message to provide the alert that the another second communication terminal that has not transmitted the sharing completion report is present; and display a second message, received from the first communication terminal, indicating that the sharing completion report has been transmitted, from an own terminal from among the plurality of second communication terminals upon on completion of sharing the shared data at the own terminal.

2. The communication system according to claim 1, wherein the program instructions stored in the first memory further cause the first processor to:

manage progress of sharing the shared data based on whether the sharing completion report has been received from the plurality of second communication terminals, and transmit the sharing incomplete status report to the at least one second communication terminal that has transmitted the sharing completion report second communication terminal has not yet transmitted the sharing completion report when a predetermined time period has elapsed after sharing of the shared data has started.

3. The communication system according to claim 2, wherein the first communication terminal stores a total number of the plurality of second communication terminals with which the shared data is to be shared, and the program instructions stored in the first memory further cause the first processor to display a number of the plurality of second communication terminals of the total number of the plurality of second communication terminals that has transmitted the share completion report or a number of the two or more second communication terminals that has not transmitted the share completion report, based on the managed progress of sharing the shared data.

4. The communication system according to claim 1, wherein the program instructions stored in the first memory further cause the first processor to transmit a sharing completed status report indicating that all of the plurality of second communication terminals have completed the sharing of the shared data to all of the plurality of second communication terminals upon determining that the sharing completion report has been received from all of the plurality of second communication terminals, and the program instructions stored in the second memory further cause the second processor of the second communication terminal to display the sharing completed status report upon receiving the sharing completed status report.

5. The communication system according to claim 4, wherein the program instructions stored in the first memory further cause the first processor to display the sharing completed status report at the first communication terminal upon determining that the sharing completion report has been received from all of the plurality of second communication terminals.

6. The communication system according to claim 1, wherein the program instructions stored in the first memory, in a case where a predetermined time period has elapsed after sharing of the shared data has started, further cause the first processor to transmit the sharing incomplete status report to the at least one second communication terminal that has transmitted the sharing completion report upon determining that there is at least one second communication terminal that has not yet transmitted the sharing completion report, and transmit the sharing incomplete status report to the at least one second communication terminal among the plurality of second communication terminals that has not transmitted the sharing completion report, and the program instructions stored in the second memory of the at least one second communication terminal that has not transmitted the share completion report further causes the second processor of the at least one second communication terminal that has not transmitted the share completion report to:

display the sharing incomplete status report, upon receiving the sharing incomplete status report.

7. The communication system according to claim 1, wherein the program instructions stored in the first memory further cause the first processor to generate a high-definition still image and a low-quality image as the shared data; and transmit the high-definition still image and the low-quality image, and each of the plurality of second communication terminals downloads one of the high-definition still image or the low-quality image according to a network status.

8. The communication system according to claim 1, wherein the shared data is a still image created by importing a screen shared by screen sharing among the first communication terminal and the plurality of second communication terminals, or a file that is stored by the first communication terminal.

9. The communication system according to claim 1, wherein the first communication terminal transmits the first message providing the alert that the another second communication terminal that has not transmitted the sharing completion report is present among the plurality of second communication terminals to the another second communication terminal that has not transmitted the sharing completion report, and the another second communication terminal, displays the second message received from the first communication terminal.

10. A data sharing method performed by a communication system including a first communication terminal and a plurality of second communication terminals that are configured to share shared data with each other, the data sharing method comprising:

transmitting the shared data to the plurality of second communication terminals from the first communication terminal;

receiving a sharing completion report indicating that sharing of the shared data has been completed, from at least one second communication terminal of the plurality of second communication terminals at which sharing of the shared data is completed;

transmitting a sharing incomplete status report and a first message to the at least one second communication terminal from which the sharing completion report has been received, (i) the sharing incomplete status report indicating a presence of another second communication terminal from among the of the plurality of second communication terminals that has not yet transmitted the sharing completion report, and (ii) the first message providing an alert that the another second communication terminal that has not transmitted the sharing completion report is present among the plurality of second communication terminals;

receiving the shared data from the first communication terminal at the second communication terminals;

displaying the first message to provide the alert that the another second communication terminal that has not transmitted the sharing completion report is present; and displaying a second message, received from the first communication terminal, indicating that the sharing completion report has been transmitted, from an own terminal from among the plurality of second communication terminals upon on completion of sharing the shared data at the own terminal.

11. A non-transitory computer-readable recording medium storing a program that causes a computer to execute a process performed in a second communication terminal that receives shared data from a first communication terminal that transmits the shared data, the process comprising:

receiving the shared data from the first communication terminal;

transmitting a sharing completion report indicating that sharing of the shared data has been completed from the second communication terminal upon completion of sharing of the shared data;

receiving a sharing incomplete status report and a first message from the first communication terminal at the second communication terminal after transmission of the sharing completion report, (i) the sharing incomplete status report indicating a presence of another second communication terminal that has not yet transmitted the sharing completion report, and (ii) the first message providing an alert that the other another second communication terminal that has not transmitted the sharing completion report is present; and displaying the first message to provide the alert that the another second communication terminal that has not transmitted the sharing completion report is present; and displaying a second message, received from the first communication terminal, indicating that the sharing completion report has been transmitted, from an own terminal upon on completion of sharing the shared data at the own terminal.

* * * * *